(12) United States Patent
Nagai et al.

(10) Patent No.: US 8,424,891 B2
(45) Date of Patent: Apr. 23, 2013

(54) STABILIZER BUSHING FOR VEHICLE AND METHOD OF PRODUCING THE SAME

(75) Inventors: Hiroaki Nagai, Komaki (JP); Hideo Yanagino, Konan (JP); Kouichi Kobayashi, Kasugai (JP); Yuji Homma, Nagoya (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 0 days.

(21) Appl. No.: 13/478,279

(22) Filed: May 23, 2012

(65) Prior Publication Data

US 2012/0299261 A1 Nov. 29, 2012

(30) Foreign Application Priority Data

May 23, 2011 (JP) .................................. 2011-114339

(51) Int. Cl.
*B60G 21/055* (2006.01)

(52) U.S. Cl.
USPC .................................................. 280/124.107

(58) Field of Classification Search ........... 280/124.107, 280/124.152; 267/292, 293, 294, 141.1, 267/141.2, 141.3, 141.4
See application file for complete search history.

(56) References Cited

U.S. PATENT DOCUMENTS

| | | | |
|---|---|---|---|
| 4,007,924 A * | 2/1977 | Jorn et al. ..................... | 267/282 |
| 5,290,018 A | 3/1994 | Watanabe et al. | |
| 2002/0186905 A1 | 12/2002 | Kammel et al. | |
| 2011/0291377 A1 | 12/2011 | Kato et al. | |

FOREIGN PATENT DOCUMENTS

| | | |
|---|---|---|
| GB | 1516572 | 7/1978 |
| JP | S61-134411 U | 8/1986 |
| JP | 4-316729 | 11/1992 |
| JP | 09-072365 | 3/1997 |
| JP | 2001-271860 | 10/2001 |
| JP | 2002-321516 | 11/2002 |
| JP | 2004-510930 | 4/2004 |
| JP | 2004-142586 | 5/2004 |
| JP | 2006-170257 | 6/2006 |
| JP | 2007-261538 | 10/2007 |
| JP | 2008-201307 | 9/2008 |

* cited by examiner

*Primary Examiner* — Faye M. Fleming
(74) *Attorney, Agent, or Firm* — Greenblum & Bernstein P.L.C.

(57) ABSTRACT

Semi-tubular portions of two partition members partitioning a bushing body into an outer rubber portion and an inner rubber portion are asymmetrically arranged with respect to a reference plane containing a central axis of the bushing body and parallel to two attachment surfaces of a bracket. In addition, each of the semi-tubular portions is configured to have a length equal to or larger than a diameter of a stabilizer bar, the length being from one end to the other end in a circumferential direction of the semi-tubular portion in a projection view obtained by projecting the semi-tubular portion to a horizontal surface in a vertical direction.

10 Claims, 12 Drawing Sheets

STABILIZER BUSHING FOR VEHICLE AND METHOD OF PRODUCING THE SAME

CROSS-REFERENCE TO RELATED APPLICATIONS

The present application claims priority under 35 U.S.C. §119 of Japanese Application No. 2011-114339, filed on May 23, 2011, the disclosure of which is expressly incorporated by reference herein in its entirety.

BACKGROUND OF THE INVENTION

1. Field of the Invention

The present invention relates to a stabilizer bushing for a vehicle and a method for producing the stabilizer bushing. More particularly, the present invention relates to a stabilizer bushing for a vehicle that is inclinedly attached to a vehicle body to support a stabilizer bar on the vehicle body in a vibration damping fashion and an advantageous method for producing such a stabilizer bushing for a vehicle.

2. Description of Related Art

As is well known, a stabilizer bar is mounted on a vehicle such as an automobile for the purpose of suppressing tilting of a vehicle body that occurs when the vehicle makes a turn or the like. Generally, the stabilizer bar is supported on a vehicle body in a vibration damping fashion via a stabilizer bushing (vibration damping bushing). The stabilizer bushing includes a bushing body that is made of a cylindrical rubber elastic body having an inner bore into which a stabilizer bar is inserted and a bracket mounted on an outer peripheral portion of the bushing body for attaching to a vehicle body such as a body or a frame of a vehicle. Usually, such a bracket is configured to include a mounting portion mounted on the outer peripheral portion of the bushing body and an attachment portion integrally formed in a manner extending out from two ends of the mounting portion in directions perpendicular to an axial direction of the bushing body and attached to the vehicle body. Further, the attachment portion is provided with two attachment surfaces extending parallel to each other. The bushing body is attached to a vehicle body by attaching the attachment portion to the vehicle in a state in which the two attachment surfaces are superimposed on the vehicle body.

A kind of such a stabilizer bushing is known having a structure in which two partition members are embedded in a middle portion in a direction perpendicular to an axial direction of the bushing body in a manner partitioning the stabilizer bushing into an inner rubber portion positioned on a more inner side than the partition members and an outer rubber portion positioned on a more outer side than the partition members, the partition members each having a semi-tubular shape with a circular arc-shaped cross section and being rigid. Conventionally, such a structure having two partition members embedded in a bushing body is frequently adopted in a stabilizer bushing that implements measures to prevent the occurrence of stick-slip.

For example, Japanese Utility Model Application Laid-Open Publication No. SHO 61-134411 (Related Art 1) discloses a structure in which two partition members are embedded in a bushing body in a stabilizer bushing that prevents the occurrence of stick-slip by fixing a sliding member made of a liner cloth and the like having surface lubricity to an inner circumferential surface of the bushing body to reduce frictional resistance between the bushing body and a stabilizer bar. In this case, due to the presence of the two partition members, elastic deformation of the inner rubber portion of the bushing body during vibration input is essentially prevented, thereby preventing occurrence of problems such as peeling of the sliding member due to the deformation of the inner circumferential surface of the bushing body. A stabilizer bushing having a structure in which two partition members are embedded in a bushing body is also disclosed in Japanese Patent Laid-Open Publication No. 2008-201307 (Relate Art 2) and the like.

However, according to a research conducted by the inventors of the present invention, it is found that it is difficult to adequately ensure operation stability and good riding comfort when a conventional stabilizer bushing having two partition members embedded in a bushing body is attached to a vehicle body in an inclined state with respect to the vehicle body. That is, it is found that, as compared to the case where a bushing body is attached to a vehicle body in a state of being horizontally arranged with respect to the vehicle body, operation stability decreases and riding comfort deteriorates in the case where the bushing body is attached to the vehicle body in a state of being inclinedly arranged with respect to the vehicle body by rotating the stabilizer bushing about a central axis for a predetermined angle and attaching the attachment portion of the bracket to the vehicle body in a state in which the two attachment surfaces of the attachment portion are superimposed on the vehicle body while being kept inclined with respect to a horizontal direction.

[Related Art 1] Japanese Utility Model Application Laid-Open Publication No. SHO 61-134411

[Related Art 2] Japanese Patent Laid-Open Publication No. 2008-201307

SUMMARY OF THE INVENTION

In view of the circumstances above, the present invention provides a stabilizer bushing for a vehicle that effectively ensures superior operation stability and good riding comfort even in the case where the stabilizer bushing is inclinedly attached to a vehicle body. Furthermore, the present invention provides a method that can advantageously produce the stabilizer bushing for a vehicle.

As an aspect of the present invention, a stabilizer bushing for a vehicle includes (a) a bushing body made of a tubular rubber elastic body having an inner bore into which a stabilizer bar is inserted; (b) a bracket having a mounting portion mounted on an outer peripheral portion of the bushing body and an attachment portion provided with two mutually parallel attachment surfaces extending outwardly in a direction perpendicular to an axial direction of the bushing body, the bracket being attached to a vehicle body in a state in which the bushing body is inclinedly arranged with respect to a horizontal direction by attaching the attachment portion to the vehicle body in a state in which the two attachment surfaces are superimposed on the vehicle body while being inclined with respect to the horizontal direction; and (c) two partition members embedded in the bushing body in a manner partitioning the bushing body into an inner rubber portion positioned on an inner side and an outer rubber portion positioned on an outer side, the two partition members each having a semi-tubular portion and being rigid. The semi-tubular portions of the two partition members are asymmetrically arranged with respect to a reference plane parallel to the two attachment surfaces of the bracket and containing a central axis of the bushing body. A length from one end to the other end in a circumferential direction of the semi-tubular portion in a projection view obtained by projecting the semi-tubular portion of each of the partition members to a horizontal surface along a vertical direction is equal to or larger than a diameter of the stabilizer bar.

According to the present aspect, when the bushing body is attached to the vehicle body in the state of being inclinedly arranged with respect to the horizontal direction, the semi-tubular portions of the two partition members can be respectively arranged on the two sides in the vertical direction sandwiching therebetween the stabilizer bar. In addition, most of the inner rubber portion surrounding the stabilizer bar can be arranged between the inner circumferential surfaces of the semi-tubular portions of the partition members and the outer circumferential surface of the stabilizer bar. Consequently, when a load is input in the vertical direction to the bushing body in a state in which the bushing body is attached to the vehicle body in an inclined state with respect to the horizontal direction, the movement (elastic deformation) of the inner rubber portion can be effectively constrained between the stabilizer bar and the semi-tubular portions. As a result, stabilization of a spring constant in the vertical direction of the bushing body in the state in which the bushing body is inclinedly arranged and attached to the vehicle body can be effectively achieved.

As another aspect of the present invention, the two partition members are arranged in such a manner that centers in the circumferential direction of the semi-tubular portions are positioned on a vertical line extending in the vertical direction in the state in which the bracket is attached to the vehicle body, and the inner rubber portion is thinner than the outer rubber portion.

According to the present aspect, in the state in which the bushing body is inclinedly arranged and attached to the vehicle body, the semi-tubular portions of the partition members are in a well-balanced arrangement in the bushing body and are arranged close to the stabilizer bar. Therefore, the movement of the inner rubber portion is further effectively constrained, and the stabilization of the spring constant in the vertical direction of the bushing body can be further effectively achieved.

As another aspect of the present invention, the mounting portion of the bracket is fixed to an outer peripheral portion of at least one of two rubber portions of the outer rubber portion positioned on two sides in the vertical direction sandwiching therebetween the semi-tubular portions of the two partition members in the state in which the bracket is attached to the vehicle body.

According to the present aspect, the mounting portion of the bracket is fixed on at least one of the two rubber portions of the outer rubber portion. Therefore, for example, as compared to the case where the mounting portion of the bracket is not fixed to the outer rubber portion, further stabilization of the spring constant in the vertical direction of the bushing body in the state in which the bushing body is inclinedly arranged and attached to the vehicle body can be more effectively realized.

As another aspect of the present invention, the semi-tubular portions of the two partition members each have a circular arc-shaped cross-sectional shape, and are arranged to form a concentric circle with an inner circumferential surface of a circular cross section of the bushing body.

According to the present aspect, the semi-tubular portion of each partition member has a circular arc-shaped inner circumferential surface corresponding to an outer circumferential surface of a circular cross section of the stabilizer bar and is arranged in a manner coaxially extending with the stabilizer bar. Therefore, when a load is input to the bushing body in the vertical direction or a torsional direction, occurrence of localized strain in the semi-tubular portions of the partition members is prevented. Thereby, good durability of the partition members and therefore the entire stabilizer bushing can be effectively ensured.

As another aspect of the present invention, the mounting portion of the bracket has a circular arc-shaped cross-sectional shape.

According to the present aspect, in particular, by adopting the configuration of the aspect just described above before this aspect at the same time, portions of the outer rubber portion positioned on the two sides sandwiching therebetween the semi-tubular portions of the two partition members can be made to have substantially the same thickness in the circumferential direction. Thereby, variation in the spring constant due to variation in the thickness of the outer rubber portion can be effectively eliminated, and stabilization of the spring constant in the vertical direction of the bushing body in the state in which the bushing body is inclinedly arranged and attached to the vehicle body can be more advantageously achieved.

As another aspect of the present invention, two rubber portions of the outer rubber portion positioned on two sides in the vertical direction sandwiching therebetween the semi-tubular portions of the two partition members in the state in which the bracket is attached to the vehicle body have the same thickness as each other along a vertical line.

According to the present aspect, the two rubber portions of the outer rubber portion can be made to have the same spring characteristics in the vertical direction. Thereby, the spring constant in the vertical direction of the bushing body in the state of being inclinedly arranged and attached to the vehicle body is more effectively stabilized.

As another aspect of the present invention, through holes capable of allowing unvulcanized rubber of the rubber elastic body that constitutes the bushing body to pass through are formed on the semi-tubular portion of the partition member.

According to the present aspect, when the bushing body is molded by vulcanization, even in a case where a cavity portion forming the inner rubber portion is narrow and small due to a thin thickness of the inner rubber portion, the unvulcanized rubber can be surely and stably filled into the cavity portion without inducing, for example, insufficient filling and the like. Thereby, stabilization of the quality of the bushing body and therefore the entire stabilizer bushing can be effectively achieved.

As another aspect of the present invention, the partition member has projections respectively projecting from two end portions in an extending direction of the semi-tubular portion outwardly in directions perpendicular to the axial direction of the bushing body, and the projecting directions of the projections are parallel to the attachment surfaces of the bracket.

According to the present aspect, a mold used when integrally molding by vulcanization the bushing body, in which the two partition members are embedded, can be made in a simple structure including split dies forming a mold cavity of the bushing body and sliding dies for holding the projections of the partition members. Further, the projections of the partition members can be sandwiched between the split dies and the sliding dies in a die-matching direction of the split dies. Thereby, simplification of a production process and reduction production cost of the stabilizer bushing can be advantageously achieved.

As another aspect of the present invention, a sliding member having surface lubricity is fixed on an inner circumferential surface of the bushing body.

According to the present aspect, the stabilizer bar can smoothly rotate relative to the stabilizer bushing. Thereby, torsional friction is effectively reduced and occurrence of stick-slip can be effectively prevented.

Another aspect of the present invention is a method for producing a stabilizer bushing for a vehicle. The stabilizer bushing includes (a) a bushing body made of a tubular rubber elastic body having an inner bore into which a stabilizer bar is inserted; (b) a bracket having a mounting portion fixed and mounted on an outer peripheral portion of the bushing body and an attachment portion provided with two mutually parallel attachment surfaces extending outwardly in a direction perpendicular to an axial direction of the bushing body, the bracket being attached to a vehicle body in a state in which the bushing body is inclinedly arranged with respect to a horizontal direction by attaching the attachment portion to the vehicle body in a state in which the two attachment surfaces are superimposed on the vehicle body while being inclined with respect to the horizontal direction; and (c) two partition members embedded in the bushing body in a manner partitioning the bushing body into an inner rubber portion positioned on an inner side and an outer rubber portion positioned on an outer side, the two partition members being rigid, each of the partition members being configured to include a semi-tubular portion coaxially extending with the bushing body and projections respectively projecting from two end portions in an extending direction of the semi-tubular portion outwardly in a direction perpendicular to the axial direction of the bushing body, and the projections of the partition members respectively projecting out from end surfaces on two sides in the axial direction of the bushing body. The method includes (I) preparing two parts as the partition members each having a length equal to or larger than a diameter of the stabilizer bar, the length being from one end to the other end in a circumferential direction of the semi-tubular portion in a projection view obtained by projecting the semi-tubular portion to a horizontal surface along a vertical direction; (II) die-matching a first die and a second die to form a mold cavity having a tubular cavity surface, in which the attachment portion of the bracket is sandwiched between the first die and the second die and the bushing body is to be formed between the first die and the second die; (III) accommodating the semi-tubular portions of the two partition members inside the mold cavity in a state in which the semi-tubular portions are arranged coaxial with the mold cavity and asymmetrical with respect to a reference plane containing a central axis of the mold cavity and parallel to the two attachment surfaces of the bracket, and projecting out from the mold cavity the projections of the two partition members in a state of being positioned parallel to the attachment surfaces of the bracket, and, in addition, accommodating the mounting portion of the bracket with respect to an outer peripheral portion of the bushing body in one of two mold cavity portions positioned on two sides that sandwich therebetween the two partition members; (IV) respectively sandwiching the projections of the two partition members that project out from the mold cavity between a pair of sliding dies and the first and second dies by sliding the pair of sliding dies in a direction perpendicular to a die-matching direction of the first and second dies; and (V) filling unvulcanized rubber of the rubber elastic body that constitutes the bushing body into the mold cavity and solidifying the unvulcanized rubber to form the bushing body, and embedding the semi-tubular portions of the two partition members in the bushing body and fixing the mounting portion of the bracket to the outer peripheral portion of the bushing body.

According to the present aspect, the stabilizer bushing can be surely produced, for which stabilization of the spring constant in the vertical direction of the bushing body in the state of being inclinedly arranged with respect to the horizontal direction and being attached to the vehicle body can be advantageously achieved.

In addition, when the bushing body is molded in the die, the projections of the two partition members are sandwiched between the pair of sliding dies and the first and second dies in the die-matching direction of the first die and the second die. Therefore, the pair of sliding dies and the first and second dies are firmly put in close contact with entire sandwiching surfaces of the projections sandwiched between the pair of sliding dies and the first and second dies by the die-matching force. Thereby, the unvulcanized rubber is effectively prevented from leaking out from between the projections and the pair of sliding dies or between the projections and the first and second dies, and occurrence of burr and the like can be effectively eliminated.

The stabilizer bushing for a vehicle according to the present invention allows stabilization of the spring constant in the vertical direction of the bushing body to be advantageously achieved even in the case of being inclinedly attached a vehicle body. Thereby, sufficient operation stability can be effectively ensured and good riding comfort can be advantageously realized.

According to the production method of the present invention of a stabilizer bushing for a vehicle, the stabilizer bushing that allows sufficient operation stability and good riding comfort to be advantageously ensured when the stabilizer bushing is inclinedly arranged and attached to the vehicle body can be very easily and effectively produced without having to perform post-processing such as deburring after the bushing body is molded.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

In the following, in order to further specifically clarify the present invention, a configuration of the present invention is explained in detail with reference to the drawings.

Figure 1:
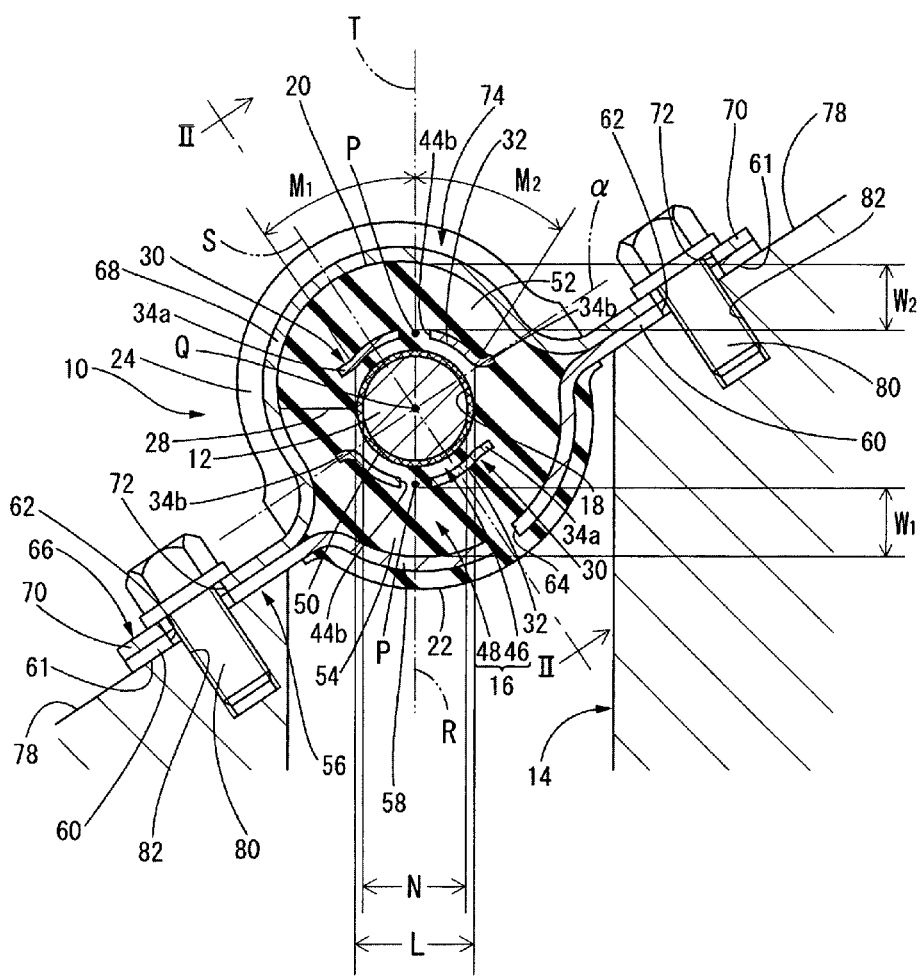
FIG. 1 is a cross sectional explanatory view taken along a direction perpendicular to an axial direction illustrating a stabilizer bushing having a structure according to an embodiment of the present invention in a state in which a stabilizer bar is inserted into an inner bore of a bushing body and the stabilizer bushing is mounted on a body of an automobile.
Figure 2:
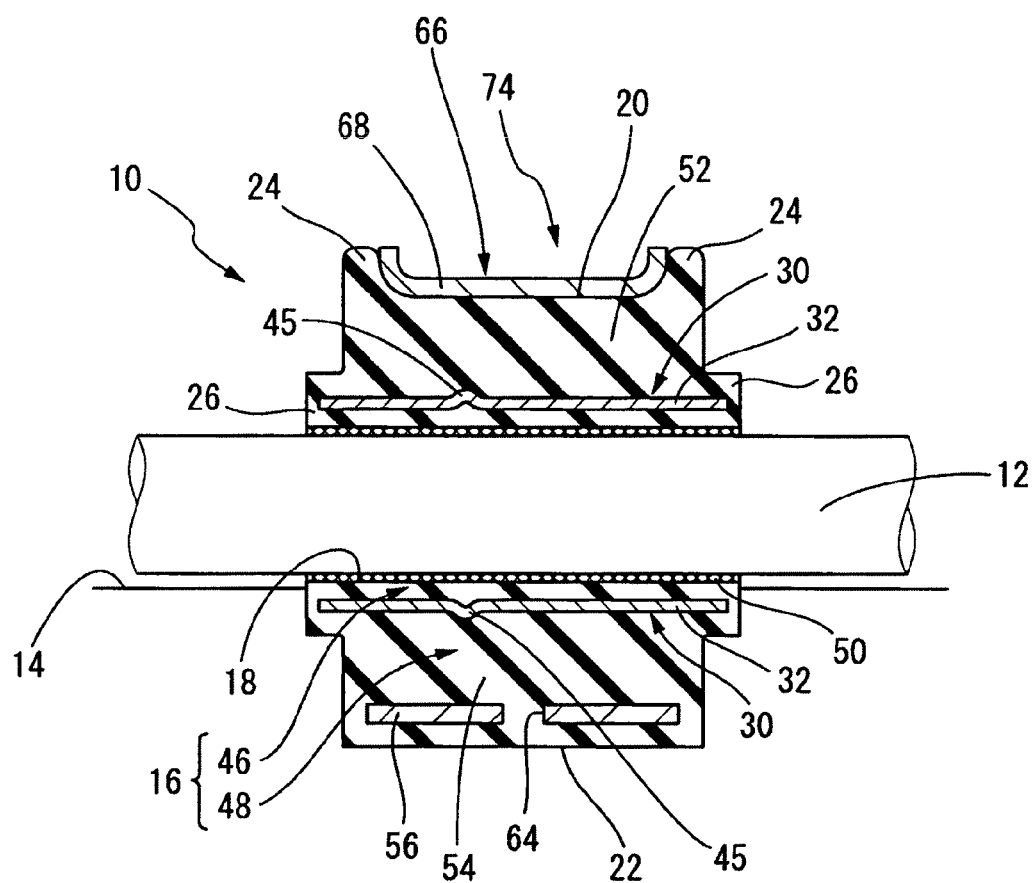
FIG. 2 is a cross sectional explanatory view taken along a line II-II in FIG. 1.

First, FIGS. 1 and 2 respectively illustrate a cross sectional form taken along a direction perpendicular to an axial direction and a cross sectional form taken along the axial direction in a state in which a stabilizer bushing for an automobile as an embodiment of a stabilizer bushing for a vehicle according to the present invention is attached to an automobile. As illustrated in FIGS. 1 and 2, a stabilizer bushing 10 is mounted on a stabilizer bar 12 of the automobile and elastically supports the stabilizer bar 12 on a body 14 of the automobile. The stabilizer bushing 10 is configured to have a bushing body 16 made of a rubber elastic body.

Figure 3:
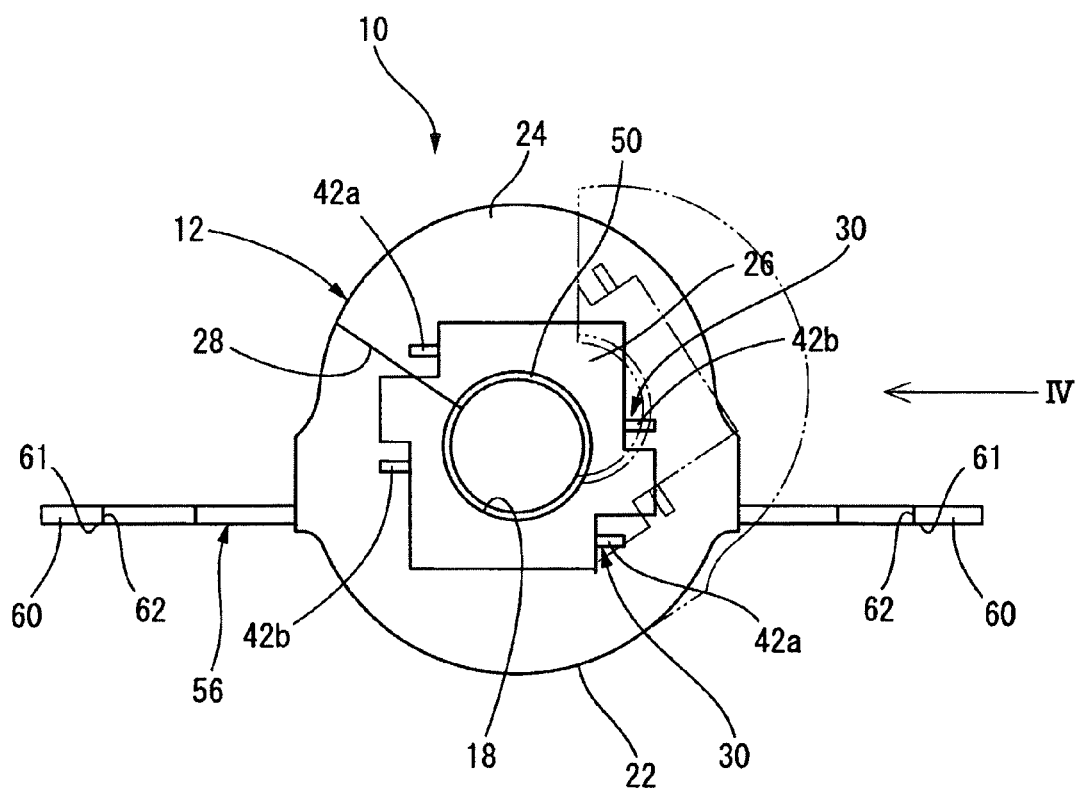
FIG. 3 is a front explanatory view of the stabilizer bushing illustrated in FIG. 1.
Figure 4:
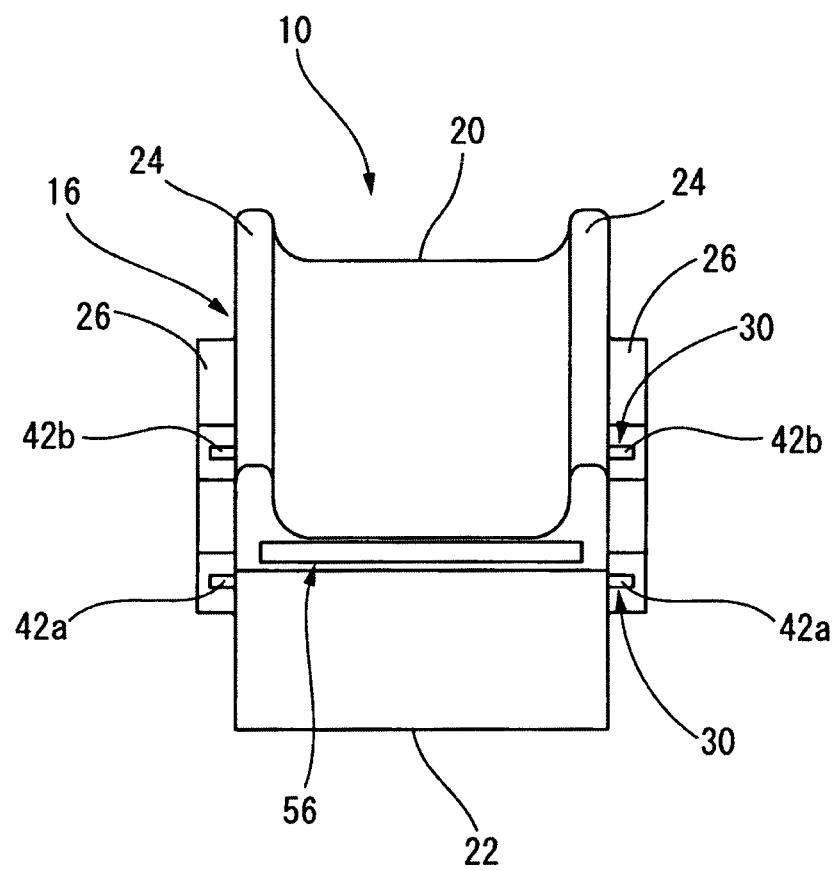
FIG. 4 is an explanatory view taken in a direction of an arrow IV in FIG. 3.

More specifically, as FIGS. 3 and 4 illustrate, the bushing body 16 has a circular cross sectional shape and is provided with an inner bore 18 extending in the axial direction. Of an outer circumferential surface of the bushing body 16, an upper side outer circumferential surface portion 20 composed of substantially a half circle on an upper side in FIG. 3 and a lower side outer circumferential surface portion 22 composed of substantially a half circle on a lower side in FIG. 3 are formed in semi-circular shapes with curvatures slightly different from each other. The bushing body 16 as a whole has substantially a tubular shape. In the following, a vertical direction in FIG. 3 is referred to as a vertical direction of the stabilizer bushing, and a vertical direction in FIG. 1 is referred to as a vertical direction of the vehicle.

On two end portions in the axial direction of the upper side outer circumferential surface portion 20 of the bushing body 16, outer flanges 24, 24 are respectively integrally provided along the circumferential direction in a state of being arranged opposing each other, each of the outer flanges 24, 24 being formed in substantially a U-shaped flat plate form and having a relatively large thickness. Further, on each of end surfaces on two sides in the axial direction of the bushing body 16, a rubber protrusion 26 protruding in an axially outward direction is integrally formed. Each rubber protrusion 26 is formed around each of openings of the inner bore 18 in a form continuously extending over the entire circumference of each of the openings, the openings respectively opening at the end surfaces on the two sides in the axial direction of the bushing body 16.

At a place on the circumference of the upper side outer circumferential surface portion 20 of the bushing body 16, a split 28 reaching the inner bore 18 is formed extending over the entire length in the axial direction of the bushing body 16. By the split 28, the rubber protrusions 26, 26 that are respectively integrally formed on the end surfaces on the two sides in the axial direction of the bushing body 16 are each also split at a place on the circumference of each of the rubber protrusions 26, 26. As a result, as illustrated by a two-dot chain line in FIG. 3, the bushing body 16 is rotatable about a portion on a side opposite to the formation portion of the split 28 in a manner that the inner bore 18 is opened toward a lateral side.

Further, as illustrated in FIGS. 1-4, two partition members 30, 30 are embedded in the bushing body 16. The two partition members 30, 30 have the same size and shape as each other. Here, the two partition members 30, 30 are bonded to the bushing body 16 by vulcanization.

Figure 5:
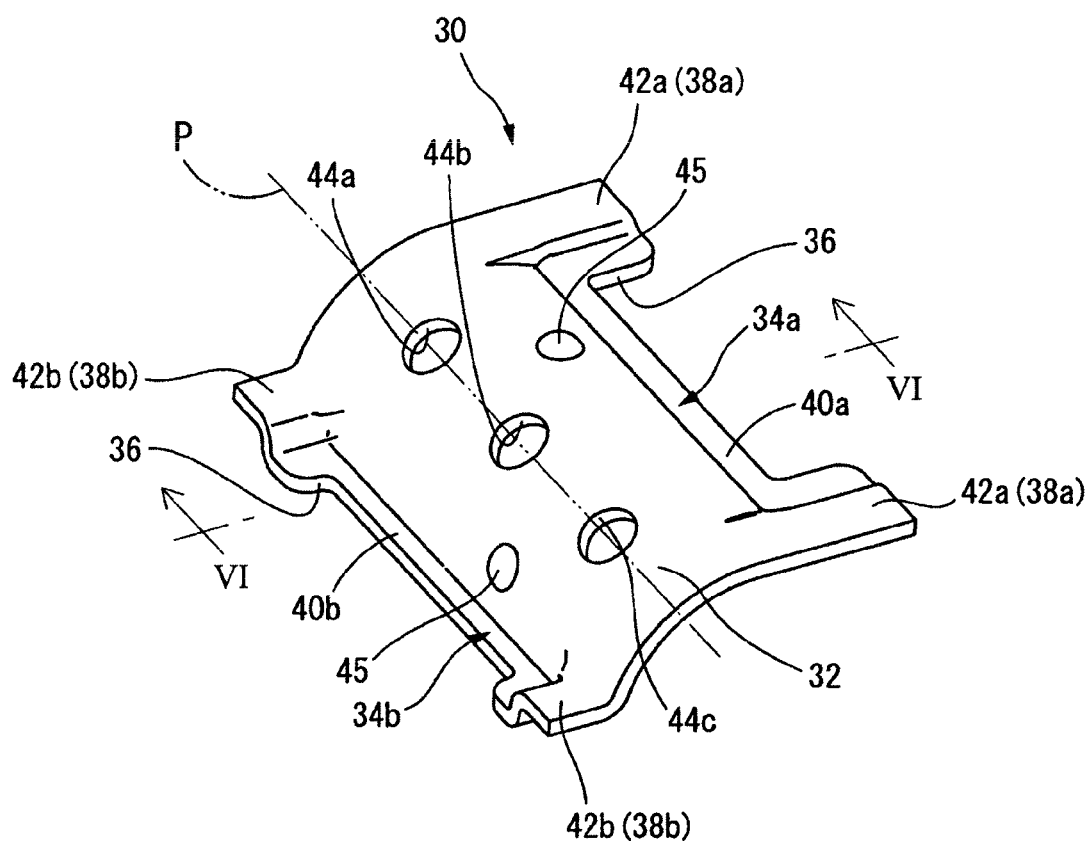
FIG. 5 is a perspective explanatory view of a partition member embedded in the bushing body of the stabilizer bushing.
Figure 6:
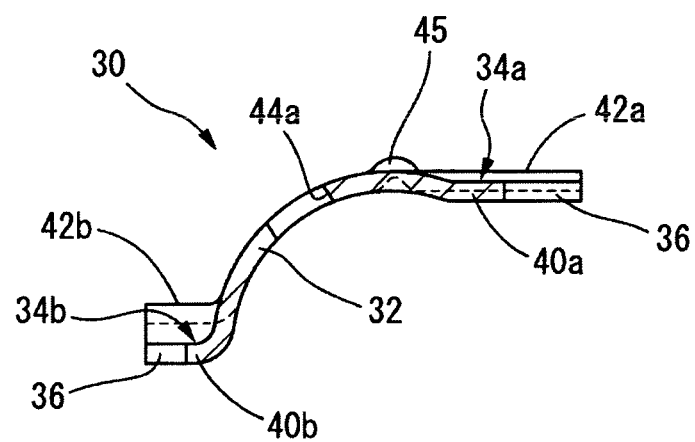
FIG. 6 is a cross sectional explanatory view taken along a line VI-VI in FIG. 5.

More specifically, as FIGS. 5 and 6 illustrate, each partition member 30 is composed of a divided tubular metal fitting having an arc-shaped semi-tubular portion 32 and outer flanges 34a, 34b, the arc-shaped semi-tubular portion 32 having a cross section taken along a direction perpendicular to the axial direction less than a half circle, and the outer flanges 34a, 34b being respectively integrally formed on two ends in the circumferential direction of the semi-tubular portion 32. The semi-tubular portion 32 of the partition member 30 has a thickness sufficiently smaller than the bushing body 16 (see FIG. 1), and has an axial length longer than the axial length of the bushing body 16 (length between the end surfaces on the two sides in the axial direction) and shorter than the length between front end surfaces of the rubber protrusions 26, 26 that are provided in a protruding manner on the end surfaces on the two sides in the axial direction of the bushing body 16 (see FIGS. 2 and 4). Further, the semi-tubular portion 32 has an inner diameter slightly larger than the inner diameter of the cylindrical bushing body 16 and an outer diameter sufficiently smaller than the respective outer diameters of the upper side outer circumferential surface portion 20 and the lower side outer circumferential surface portion 22 (see FIGS. 1 and 2). The difference between the inner diameter of the semi-tubular portion 32 and the inner diameter of the bushing body 16 is made sufficiently smaller than the difference between the outer diameter of the semi-tubular portion 32 and each of the outer diameters of the upper side and lower side outer circumferential surface portions 20, 22 (see FIGS. 1 and 2).

Further, a length L from one end to the other end in the circumferential direction of the semi-tubular portion 32 in a projection view taken along a thickness direction at a center portion in the circumferential direction of the semi-tubular portion 32, in other words, in a state in which the stabilizer bushing 10 is mounted on the body 14 of the automobile, a length L from one end to the other end in the circumferential direction of the semi-tubular portion 32 in a projection view obtained by projecting the semi-tubular portion 32 to a horizontal surface along a vertical direction, is the same as or larger than a diameter N of the stabilizer bar 12 (see FIG. 1). However, the length L referred to here is a length from one end to the other end of an arc portion in the circumferential direction of the semi-tubular portion 32 in the projection view obtained by projecting the semi-tubular portion 32 to the horizontal surface along the vertical direction. The length L does not include the outer flanges 34a, 34b that are integrally formed on the two ends of the semi-tubular portion 32.

On the other hand, the outer flanges 34a, 34b that are respectively integrally formed on the two ends in the circumferential direction of the semi-tubular portion 32 each protrude in a radially outward direction of the semi-tubular portion 32 to a predetermined height and has a flat plate shape continuously extending in the axial direction. At a middle portion in the extending direction (the axial direction of the partition member 30) of each of the outer flanges 34a, 34b, a rectangular cut-out portion 36 is formed. Consequently, end portions on the two sides in the extending direction of each of the outer flanges 34a, 34b are formed as wide portions 38a, 38a, 38b, 38b having a wider width than the middle portion in the extending direction. The middle portions in the extending direction of the outer flanges 34a, 34b form narrow portions 40a, 40b.

Further, at a middle portion in a width direction of each of the wide portions 38a, 38b, a step is formed. Consequently, of each of the wide portions 38a, 38b, portions positioned on outer sides in the axial direction (extending direction) of the semi-tubular portion 32 are one step higher than portions positioned on inner sides in the axial direction. Of the wide portions 38a, 38b, the portions on the outer sides in the axial direction that are one step higher project out from the two end surfaces in the axial direction of the bushing body 16 and form flat plate-like projections 42a, 42b that respectively extend out in directions perpendicular to the axial direction of the bushing body 16 (see FIGS. 3 and 4).

Further, three through holes 44a, 44b, 44c are drilled through the semi-tubular portion 32 of the partition member 30. The three through holes 44a, 44b, 44c are formed in a circular shape and are arranged at a central portion in the circumferential direction of the semi-tubular portion 32 at places that quarter the semi-tubular portion 32 in the axial direction. That is, the three through holes 44a, 44b, 44c are arranged at equal intervals from each other in a state in which centers of the three through holes 44a, 44b, 44c are positioned on a central line P of the circumferential direction that extends in the axial direction of the semi-tubular portion 32.

The three through holes 44a, 44b, 44c each have a size sufficient for unvulcanized rubber to pass through when the partition member 30 is bonded to the bushing body 16 by vulcanization, that is, when the bushing body 16 and the partition member 30 are integrally molded by vulcanization. A specific size (such as an opening area and an inner diameter) of the three through holes 44a, 44b, 44c can be suitably determined according to the overall size of the bushing body 16, the number of formed through holes 44 on the partition member 30, or the thickness of an inner rubber portion 46 (which will be described later). Further, as FIGS. 5 and 6 illustrate, a projecting portion 45 is integrally formed on each of the two sides in the width direction of the semi-tubular portion 32.

As FIGS. 1 and 2 illustrate, the two partition members 30, 30 having the structure as described above are embedded in middle portions in directions perpendicular to the axial direction of the bushing body 16 sandwiching the inner bore 18 therebetween in a state in which inner circumferential surfaces of the semi-tubular portions 32, 32 are arranged opposing each other. That is, the semi-tubular portions 32, 32 of the partition members 30, 30 are arranged in a manner forming a concentric circle with the inner circumferential surface of the inner bore 18 of the bushing body 16 that exhibits a circular cross section, and are embedded in a state of being arranged to coaxially extend with the inner bore 18. This allows the bushing body 16 to be partitioned by the semi-tubular portions 32, 32 of the two partition members 30, 30 into an inner rubber portion 46 positioned on a more inner side than the semi-tubular portions 32, 32 of the two partition members 30, 30 and an outer rubber portion 48 positioned on a more outer aside than the semi-tubular portions 32, 32 of the two partition members 30, 30. The semi-tubular portion 32 of each partition member 30 is bonded to the inner rubber portion 46 by vulcanization at the inner circumferential surface the semi-tubular portion 32 and is bonded to the outer rubber portion 48 by vulcanization at the outer circumferential surface of the semi-tubular portion 32.

Further, as described above, the difference between the inner diameter of the semi-tubular portion 32 of each of the two partition members 30, 30 and the inner diameter of the bushing body 16 is made sufficiently smaller than the difference between the outer diameter of the semi-tubular portion 32 and the outer diameter of each of the upper and lower side outer circumferential surface portions 20, 22 of the bushing body 16. This allows the inner rubber portion 46 to be made sufficiently thinner than the outer rubber portion 48. In the present embodiment, the inner rubber portion 46 is configured to have an extremely thin thickness so that the inner rubber portion 46 does not elastically deform when a load is input in a direction perpendicular to the axial direction of the bushing body 16 in a state in which the stabilizer bushing 10 is mounted on the automobile. In other words, by making the inner rubber portion 46 sufficiently thin, as will be described later, in a state in which the stabilizer bar 12 is inserted into the inner bore 18 of the bushing body 16 and the stabilizer bushing 10 is attached to the body 14 of the automobile, when the stabilizer bar 12 is relatively displaced with respect to the bushing body 16 in a direction perpendicular to the axial direction of the bushing body 16 (the thickness direction of the inner rubber portion 46 and the outer rubber portion 48), the inner rubber portion 46 does not elastically deform in the thickness direction. The thickness of the inner rubber portion 46 can be suitably determined according to the overall size of the bushing body 16, the size of a load input to the bushing body 16 in the state in which the stabilizer bushing 10 is mounted on the automobile, and the like.

As illustrated in FIG. 1, in the present embodiment, a position in the circumferential direction of the semi-tubular portion 32 of each of the two partition members 30, 30 with respect to the bushing body 16 is a special position that is different from a conventional product.

That is, in a conventional stabilizer bushing, for example, as illustrated in FIG. 6 of Japanese Patent Laid-Open Publication No. 2008-201307, a relative position in the circumferential direction of the semi-tubular portion 32 of each of the two partition members 30, 30 with respect to the bushing body 16 is a position where a first reference line R coincides with a second reference line S, the first reference line R extending along a direction perpendicular to a central line P (see FIG. 5) of circumferential direction of each semi-tubular portion 32 and a central axis Q of the bushing body 16 (inner bore 18), the second reference line S extending along the vertical direction of the stabilizer bushing containing the central axis Q of the bushing body 16. Here, the reference numerals in the drawings of the present specification are used as the reference numerals in the explanation of the conventional stabilizer bushing illustrated in FIG. 6 of Japanese Patent Laid-Open Publication No. 2008-201307.

The central line P of the circumferential direction of the semi-tubular portion 32, as described above, refers to a line bisecting the semi-tubular portion 32 in the circumferential direction in such a manner that, in the semi-tubular portion 32 having a length from one end to the other end in the circumferential direction in a projection view taken in the thickness direction equal to or larger than the diameter of the stabilizer bar 12, a length $M_1$ in the circumferential direction of a portion from the central line P to the one end in the circumferential direction of the semi-tubular portion 32 and a length $M_2$ in the circumferential direction of a portion from the central line P to the other end in the circumferential direction of the semi-tubular portion 32 are the same. Further, the second reference line S extending in the vertical direction of the stabilizer bushing refers to a perpendicular line perpendicular to a central line of the circumferential direction of the upper side outer circumferential surface portion 20 and a central line of the circumferential direction of the lower side outer circumferential surface portion 22, the central lines extending in the axial direction of the bushing body 16. It should be understood that, in the above description, FIGS. 1 and 2 are used to assign the reference numerals for the parts.

In contrast, in the stabilizer bushing of the present embodiment, as FIG. 1 illustrates, relative positions in the circumferential direction of the two semi-tubular portions 32, 32 with respect to the bushing body 16 are positions arrived at by rotating the two semi-tubular portions 32, 32 for a predetermined angle about the central axis Q of the bushing body 16 from the positions at which the first reference line R coincides with the second reference line S. That is, the positions of the two semi-tubular portions 32, 32 in the bushing body 16 are positions at which the first reference line R and the second reference line S intersect each other.

In other words, the arrangement positions of the two partition members 30, 30 in the bushing body 16 are configured in such a manner that the central line P of the circumferential direction of each of the two semi-tubular portions 32, 32 is positioned on the first reference line R and the two semi-tubular portions 32, 32 are asymmetrically positioned with respect to a reference plane α that contains the central axis Q of the bushing body 16 and is perpendicular to the second reference line S.

Further, in the present embodiment, in the arrangement state of the two partition members 30, 30 in the bushing body 16 as described above, the outer flanges 34a, 34b that project from the semi-tubular portion 32 of one partition member 30 and the outer flanges 34a, 34b that project from the semi-tubular portion 32 of the other partition member 30 are arranged extending in parallel to the reference plane α while opposing each other across a predetermined distance in the radial direction of the bushing body 16.

In this way, the projecting directions of the flat plate-like projections 42a, 42b from the semi-tubular portion 32 are parallel to the reference plane α, the projections 42a, 42b each being composed of a portion of the outer flanges 34a, 34b. In addition, at the end surfaces on the two sides in the axial direction of the bushing body 16, the extending directions of the projections 42a, 42b that respectively extend out in directions perpendicular to the axial direction of the bushing body 16 are also parallel to the reference plane α. Here, the split 28 is formed in a portion of the outer rubber portion 48 positioned between the mutually opposing outer flanges 34a, 34b. Thereby, opening at the split 28 of the bushing body 16 can be smoothly performed without being interfered by the two partition members 30, 30 embedded in the bushing body 16.

Further, as FIG. 1 illustrates, a portion of the outer rubber portion 48 that is arranged on a more upper side than the semi-tubular portion 32 positioned on the upper side of the two semi-tubular portions 32, 32 and has the upper side outer circumferential surface portion 20 as an outer circumferential surface is an upper outer rubber portion 52, and a portion of the outer rubber portion 48 that is arranged on a more lower side than the semi-tubular portion 32 positioned on the lower side of the two semi-tubular portions 32, 32 and has the lower side outer circumferential surface portion 22 as an outer circumferential surface is a lower outer rubber portion 54. The upper and lower outer rubber portions 52, 54 both have a substantially semi-tubular overall shape.

A bracket 56 is fixed to the lower outer rubber portion 54 of the outer rubber portion 48 in a partially embedded state. The bracket 56, as a whole, is composed of a long rectangular plate-shaped bracket. A central portion in the length direction of the bracket 56 is a fixing portion 58 as a mounting portion, and two end side portions in the length direction of the bracket 56 are attachment portions 60, 60.

The fixing portion 58 has a substantially semi-tubular shape with a circular arc-shaped cross section that is slightly smaller than the lower side outer circumferential surface portion 22 of the bushing body 16. Further, the attachment portions 60, 60, as a whole, have the same rectangular flat plate shape. Lower surfaces of the attachment portions 60, 60 are attachment surfaces 61, 61, which are flat surfaces. That is, in the present embodiment, the bracket 56 has the two attachment portions 60, 60, and the two attachment portions 60, 60 are each provided with one attachment surface 61. A bolt insertion hole 62 is drilled through a central portion in the length direction of each of the two attachment portions 60, 60. Such attachment portions 60, 60 respectively integrally extend out from the two ends in the circumferential direction of the fixing portion 58 in radially outward directions of the fixing portion 58.

The fixing portion 58 is arranged inside the outer circumference of the lower outer rubber portion 54 of the outer rubber portion 48 in a manner coaxially extending with the inner bore 18 of the bushing body 16. Inner and outer circumferential surfaces of the fixing portion 58 are fixed (bonded by vulcanization) to the lower outer rubber portion 54. Further, in the state in which the fixing portion 58 is fixed to the lower outer rubber portion 54, the two attachment portions 60, 60 extend out from the lower outer rubber portion 54 in directions perpendicular to the axial direction of the bushing body 16. The attachment surfaces 61, 61 of the two attachment portions 60, 60 are parallel to the reference plane α. That is, the reference plane α is parallel to the attachment surface 61 of each of the two attachment portions 60, 60 of the bracket 56 fixed to the lower outer rubber portion 54. Thereby, the attachment surface 61 of each attachment portion 60 is parallel to each of the projections 42a, 42b of each partition member 30 that project out from end surfaces on the two sides in the axial direction of the bushing body 16.

Thus, of the lower outer rubber portion 54 of the outer rubber portion 48, a portion on a more inner side than the fixing portion 58 of the bracket 56 is configured as a portion that surely elastically deforms to effectively perform a vibration damping function when a load is input to the bushing body 16 in a direction perpendicular to the axial direction. Further, of the lower outer rubber portion 54, a portion on a more outer side than the fixing portion 58 of the bracket 56 is a thin rubber covering portion that covers the entire outer circumferential surface of the fixing portion 58 and imparts anti-corrosiveness to the fixing portion 58. In FIG. 1, a through hole 64 is for unvulcanized rubber to pass through from the inner side of the fixing portion 58 of the bracket 56 to the outer side of the fixing portion 58 of the bracket 56 when the bushing body 16 is molded.

In the present embodiment, in particular, of the lower outer rubber portion 54 of the outer rubber portion 48, a portion positioned on a more inner side than the fixing portion 58 of the bracket 56 has a thickness $W_1$ along the first reference line R that is substantially the same as a thickness $W_2$ of the upper outer rubber portion 52 along the first reference line R. That is, in the lower outer rubber portion 54 and the upper outer rubber portion 52, the portions that perform effective vibration damping function with respect to a load input to the bushing body 16 in a direction perpendicular to the axial direction have substantially the same thickness as each other along the load input direction.

Further, as FIGS. 1 and 2 illustrate, on the inner circumferential surface of the inner rubber portion 46 of the bushing body 16, a liner cloth 50 is fixed as a sliding member. The liner cloth 50 has a thin-walled tubular shape having an outer diameter that corresponds to the inner diameter of the inner rubber portion 46 and an axial length that is the same as a distance between front end surfaces of the rubber protrusions 26, 26 that are respectively integrally formed on the end surfaces on the two sides in the axial direction of the bushing body 16. The liner cloth 50 covers the entire inner circumferential surface of the inner rubber portion 46 and the entire inner circumferential surface of the rubber protrusion 26. A cut is provided in the liner cloth 50 at a position corresponding to the split 28 provided in the bushing body 16.

This imparts sufficient slidability to the entire inner circumferential surface of the inner rubber portion 46. In this way, in the state in which the stabilizer bar 12 is inserted into the inner bore 18 of the bushing body 16, the stabilizer bar 12 can smoothly rotate relative to the inner rubber portion 46 of the bushing body 16. As a result, torsional friction between the inner circumferential surface of the bushing body 16 and the outer circumferential surface of the stabilizer bar 12 is more effectively and stably reduced, occurrence of noise caused by rotation of the stabilizer bar 12 in a torsional direction can be more effectively prevented and good riding comfort can be more advantageously ensured.

The kind of the liner cloth 50 is not particularly limited as long as the liner cloth 50 has surface lubricity. Examples of a material that can be used as the liner cloth 50 include a fluororesin fabric material such as Teflon (registered trademark) cloth that is mainly composed of fluororesin fiber, a knitted fabric made of polyamide fiber, and the like.

As FIG. 1 illustrates, the stabilizer bushing having a structure as described above is inclinedly attached to the automobile.

That is, when the stabilizer bushing is attached to the automobile, first, the upper outer rubber portion 52 of the bushing body 16 is rotated about the portion on the side opposite to the formation portion of the split 28 so that the inner bore 18 is opened toward a lateral side, and the stabilizer bar 12 is inserted into the inner bore 18 to be arranged therein.

Next, a bracket 66, which is different from the bracket 56 that is fixed on the bushing body 16, is mounted on the upper outer rubber portion 52 of the bushing body 16.

The bracket 66, as a whole, is composed of a long rectangular plate-shaped bracket. A central portion in the length direction of the bracket 66 is a mounting portion 68, and two end side portions in the length direction of the bracket 66 are attachment portions 70, 70. The mounting portion 68 has a semi-tubular shape with a circular arc-shaped cross section corresponding to the upper side outer circumferential surface portion 20 and an axial length slightly shorter than the distance between the two outer flanges 24, 24 of the bushing body 16. The attachment portions 70, 70 have the same rectangular flat plate-shaped overall shape. A bolt insertion hole 72 is drilled through a central portion in the length direction of each of the attachment portions 70, 70. Such attachment portions 70, 70 respectively integrally extend out from the two ends in the circumferential direction of the mounting portion 68 in radially outward directions of the mounting portion 68.

The mounting portion 68 of the bracket 66 is superimposed on the upper side outer circumferential surface portion 20 of the bushing body 16 to mount the bracket 66 on the upper outer rubber portion 52. In this case, the attachment portions 70, 70 of the bracket 66 are superimposed on the attachment portions 60, 60 of the bracket 56 that is fixed to the lower outer rubber portion 54 of the bushing body 16 in a state in which mutually corresponding insertion holes 62, 62, 72, 72 are coaxially positioned with respect to each other. Consequently, an assembly body 74 is obtained in which the bracket 66 is assembled to the stabilizer bushing.

Next as FIG. 1 illustrates, the assembly body 74 is arranged in a state in which the first reference line R coincides with a vertical line T, the first reference line R extending perpendicular to the central line P of the circumferential direction of the semi-tubular portion 32 of each of the two partition members 30, 30 and the central axis Q of the bushing body 16 (the inner bore 18), the vertical line T extending along the vertical direction of the automobile. In this case, the bushing body 16 is arranged in such a manner that the second reference line S intersects the vertical line T, the second reference line S being a perpendicular line perpendicular to the central line of the circumferential direction of the upper side outer circumferential surface portion 20 and the central line of the circumferential direction of the lower side outer circumferential surface portion 22, the central lines extending along the axial direction of the bushing body 16. In addition, the attachment portions 60, 60 of the bracket 56 positioned in parallel to the reference plane α that is perpendicular to the reference line S is arranged in an inclined state intersecting the horizontal direction of the body 14 of the automobile.

The attachment surface 61 of each of the attachment portions 60, 60 of the bracket 56 of the assembly body 74 in such an arrangement state is superimposed on an attachment surface 78 of the body 14 of the automobile. Attaching bolts 80, 80 are inserted through the bolt insertion holes 62, 62, 72, 72 of the attachment portions 60, 60, 70, 70 that are respectively provided on the bracket 56 and the bracket 66, which is superimposed on the bracket 56, and are threaded into female screw holes 82, 82 that are provided on the attachment surface 78 of the body 14.

Thus, the stabilizer bushing is inclinedly attached to the body 14, and the stabilizer bar 12 is supported on the body 14 in a vibration damping fashion via the stabilizer bushing.

As described above, when the stabilizer bushing 10 of the present embodiment is attached to the body 14 in an inclined state with respect to the horizontal direction, the semi-tubular portions 32, 32 of the two partition members 30, 30 are respectively arranged on two sides in the vertical direction sandwiching the stabilizer bar 12 therebetween. In addition, most of the inner rubber portion 46 surrounding the stabilizer bar 12 is arranged between the inner circumferential surfaces of the semi-tubular portions 32, 32 of the partition members 30, 30 and the outer circumferential surface of the stabilizer bar 12. Consequently, when a load is input in the vertical direction to the bushing body 16 in the state in which the stabilizer bushing 10 is attached to the body 14 in an inclined state, the movement (elastic deformation) of the inner rubber portion 46 is effectively constrained between the stabilizer bar 12 and the semi-tubular portions 32, 32. As a result, stabilization of a spring constant in the vertical direction of the outer rubber portion 48 of the bushing body 16 can be effectively achieved.

In addition, when the stabilizer bushing 10 is attached to the body 14 in an inclined state, the bushing body 16 is arranged in such a manner that the first reference line R coincides with the vertical line T of the body 14, that is, coincides with the input direction of the load in the vertical direction of the automobile. Therefore, the semi-tubular portion 32 of each of the two partition members 30, 30 embedded in the bushing body 16 is arranged in a manner that the central line P of the circumferential direction of the semi-tubular portion 32 is perpendicular to the vertical line T. Thereby, in each semi-tubular portion 32, portions located on two sides sandwiching the vertical line T therebetween have same lengths $M_1$, $M_2$ in the circumferential direction. Further, of the lower outer rubber portion 54 of the outer rubber portion 48, the portion positioned on a more inner side than the fixing portion 58 of the bracket 56, that is, the portion of the lower outer rubber portion 54 that performs the vibration damping function when a load is input in the vertical direction, has the thickness $W_1$ along the vertical line T that is substantially the same as the thickness $W_2$ of the upper outer rubber portion 52 along the vertical line T. Further, the lower outer rubber portion 54 is fixed to the fixing portion 58 of the bracket 56. These also effectively stabilize the spring constant in the vertical direction of the outer rubber portion 48.

Therefore, for the stabilizer bushing 10 according to the present embodiment in the state of being inclinedly attached to the body 14, sufficient operation stability can be ensured, and good riding comfort can be effectively realized.

Further, in the stabilizer bushing 10, the fixing portion 58 of the bracket 56 embedded in the lower outer rubber portion 54 of the bushing body 16 has a circular arc-shaped cross section. Therefore, the thickness of the upper outer rubber portion 52 and the thickness of the lower outer rubber portion 54 are uniform, without variation, in the circumferential direction of the bushing body 16. Therefore, even when the input direction of a load to the automobile is slightly inclined with respect to the vertical direction, the thickness of the upper outer rubber portion 52 and the thickness of the lower outer rubber portion 54 that perform effective vibration damping function with respect to the input load are effectively maintained at substantially the same thickness. This also effectively achieves the stabilization of the spring constant in the vertical direction of the outer rubber portion 48 of the bushing body 16.

Further, in the present embodiment, the semi-tubular portions 32, 32 of the two partition members 30, 30 have circular arc-shaped cross sections and are arranged to form a concentric circle with the inner circumferential surface of a circular cross section of the bushing body 16. Therefore, the semi-tubular portions 32, 32 that surround the stabilizer bar 12 via the inner rubber portion 46 have an arc-shaped inner circumferential surface corresponding to the outer circumferential surface of the stabilizer bar 12, and are arranged to coaxially extend with the stabilizer bar 12. Thereby, when a load is input to the stabilizer bar 10 in the vertical direction or a torsional direction, occurrence of stress concentration on one portion of the semi-tubular portions 32, 32 is avoided, and occurrence of localized strain in the semi-tubular portions 32, 32 is prevented. As a result, good durability of the partition members 30, 30 and therefore the entire stabilizer bushing 10 can be advantageously ensured.

Figure 7:
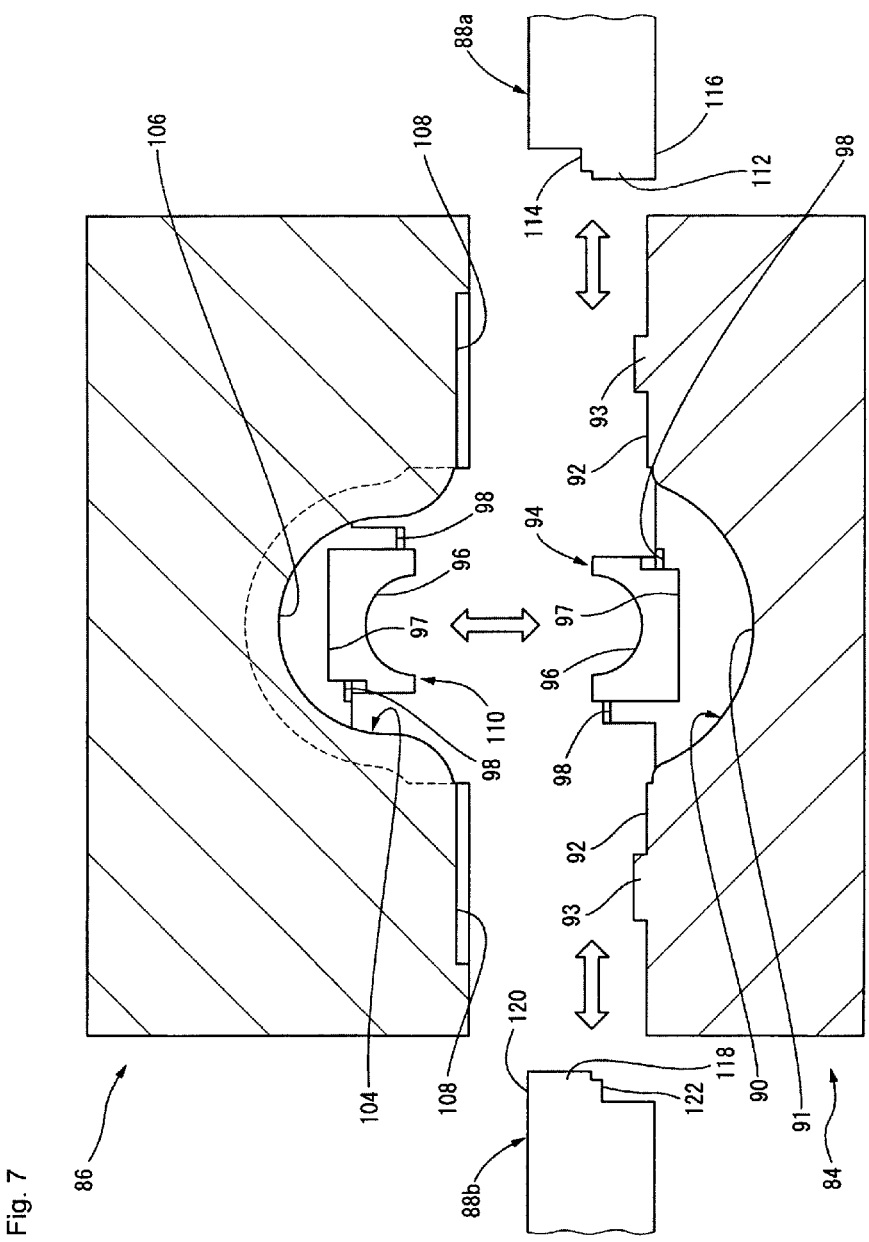
FIG. 7 is an explanatory view illustrating a molding die used when producing the stabilizer bushing illustrated in FIG. 3.

The stabilizer bushing having superior characteristics as described above is produced according to the following steps, for example, by using a die for injection molding having a structure as illustrated in FIG. 7.

That is, as FIG. 7 illustrates, the die for injection molding used here includes a lower die 84 of a fixed position, an upper die 86 capable of moving close to and moving away from the lower die 84 in the vertical direction, and a pair of first and second sliding dies 88a, 88b capable of moving close to and moving away from the lower die 84 in the horizontal direction.

Figure 8:
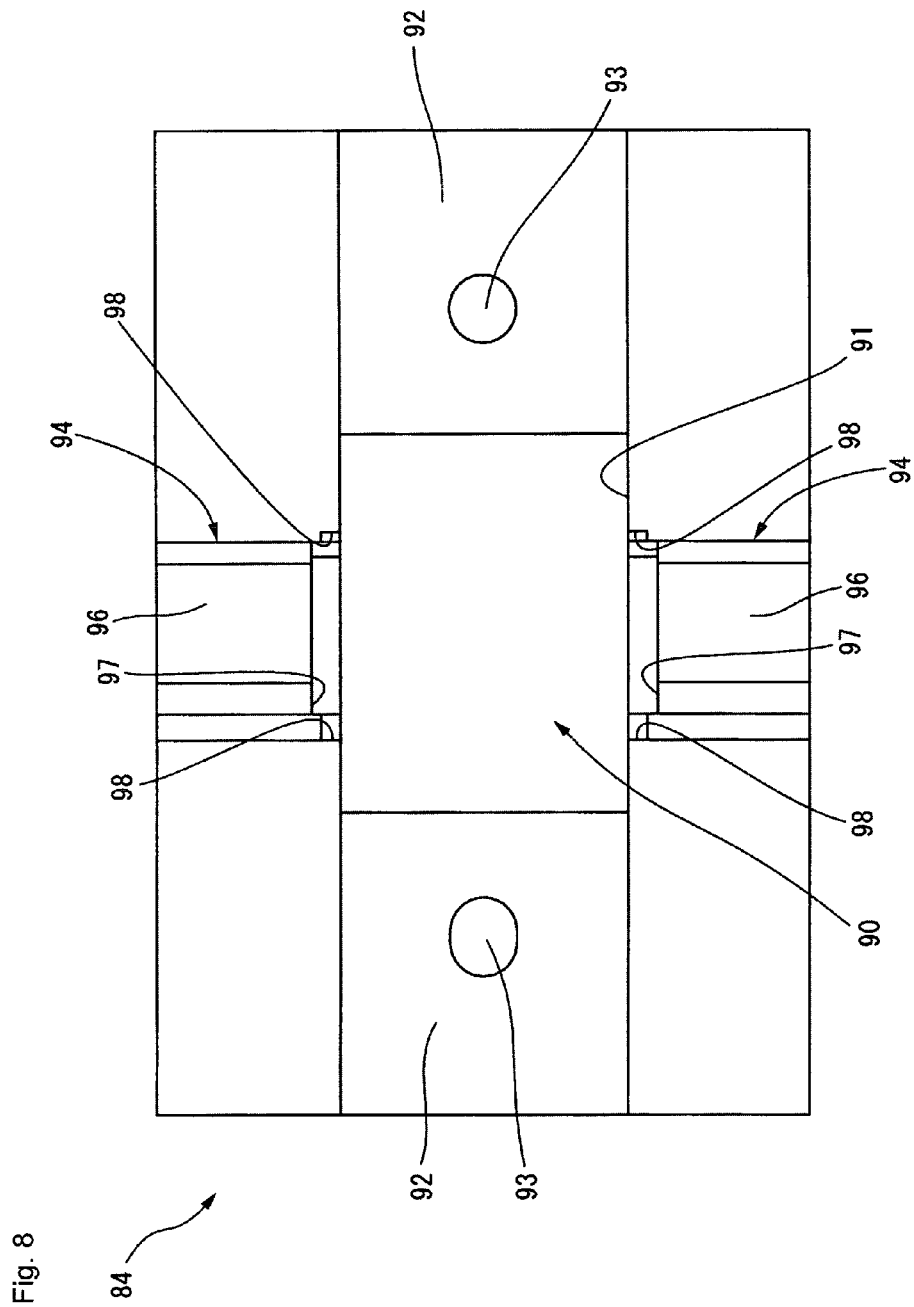
FIG. 8 is a top explanatory view of a lower die included in the molding die illustrated in FIG. 7.
Figure 9:
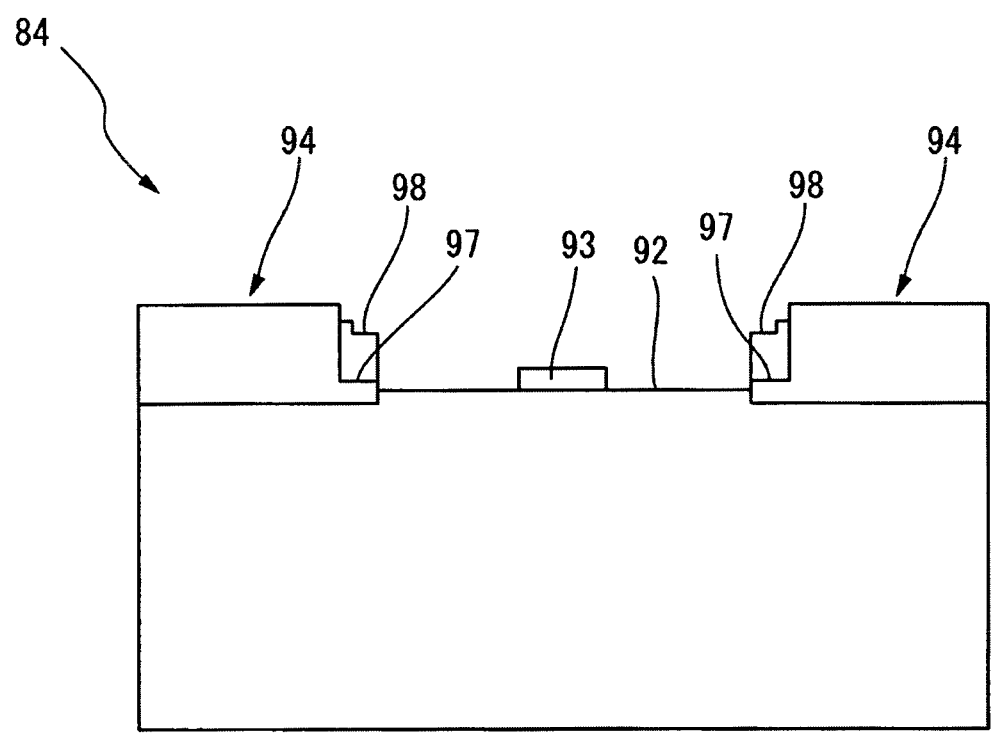
FIG. 9 is a right side explanatory view of the lower die included in the molding die illustrated in FIG. 7.

More specifically, as FIGS. 7-9 illustrate, the lower die 84, as a whole, has a shape of a long rectangular block. At a central part of an upper surface of the lower die 84, a lower die side cavity formation recess 90 is provided. An inner surface of the lower die cavity formation recess 90 is a lower die side cavity surface 91 that has a substantially semi-arc shape corresponding to the lower side outer circumferential surface portion 22 of the bushing body 16.

Further, on two sides in a length direction that sandwich therebetween the lower die side cavity formation recess 90 of the lower die 84, attachment portion support surfaces 92 are respectively provided that respectively support the attachment surfaces 61 of the attachment portions 60, 60 of the bracket 56 and are composed of horizontal flat surfaces. In addition, on each of these attachment portion support surfaces 92, one positioning projection 93 is integrally provided in a projecting manner to be fitted into the bolt insertion hole 62 provided on each attachment portion 60 of the bracket 56.

On the other hand, on each of the two sides in a width direction that sandwich therebetween the lower die side cavity formation recess 90 of the lower die 84, one sandwiching projection 94 is provided in a projecting manner. These two sandwiching projections 94, 94 have, as a whole, mutually the same rectangular block-like shape that is sufficiently smaller than the lower die 84. A center die holding groove 96 for holding a column-shaped center die 95, into which the liner cloth 50 formed in a tubular shape in advance is externally inserted (see FIG. 12), is formed on a central portion in a width direction of an upper surface of each sandwiching projection 94. The center die holding groove 96 has an inner surface of a semi-tubular surface shape corresponding to a half of an outer circumferential surface of the center die 95.

Further, a rubber protrusion formation recess 97 is provided on an end portion on a center side of the lower die 84 on the upper surface of each sandwiching projection 94. The rubber protrusion formation recess 97 has an inner surface shape corresponding to an outer surface shape of the rubber protrusion 26 provided on the end surface in the axial direction of the bushing body 16. In addition, one projection sandwiching recess 98 is provided on each of two sides of the rubber protrusion formation recess 97 on the upper surface of the sandwiching projection 94. Inner side shapes of the projection sandwiching recesses 98, 98 respectively correspond to the shapes of the outer surfaces of the projections 42a, 42b integrally formed on the semi-tubular portion 32 (surfaces continuous to the outer circumferential surface of the semi-tubular portion 32), and bottom surfaces of the projection sandwiching recesses 98, 98 are flat horizontal surfaces. In addition, one of the two projection sandwiching recesses 98, 98 has a larger projection height from a separation distance from the formation surface of the sandwiching projection 94 of the lower die 84 than the other one. Although not illustrated in the drawings, in the lower die 84, a sprue is provided guiding unvulcanized rubber injected from an injection molding machine (not illustrated in the drawings) to the inside of a mold cavity 102, which will be described later.

Figure 10:
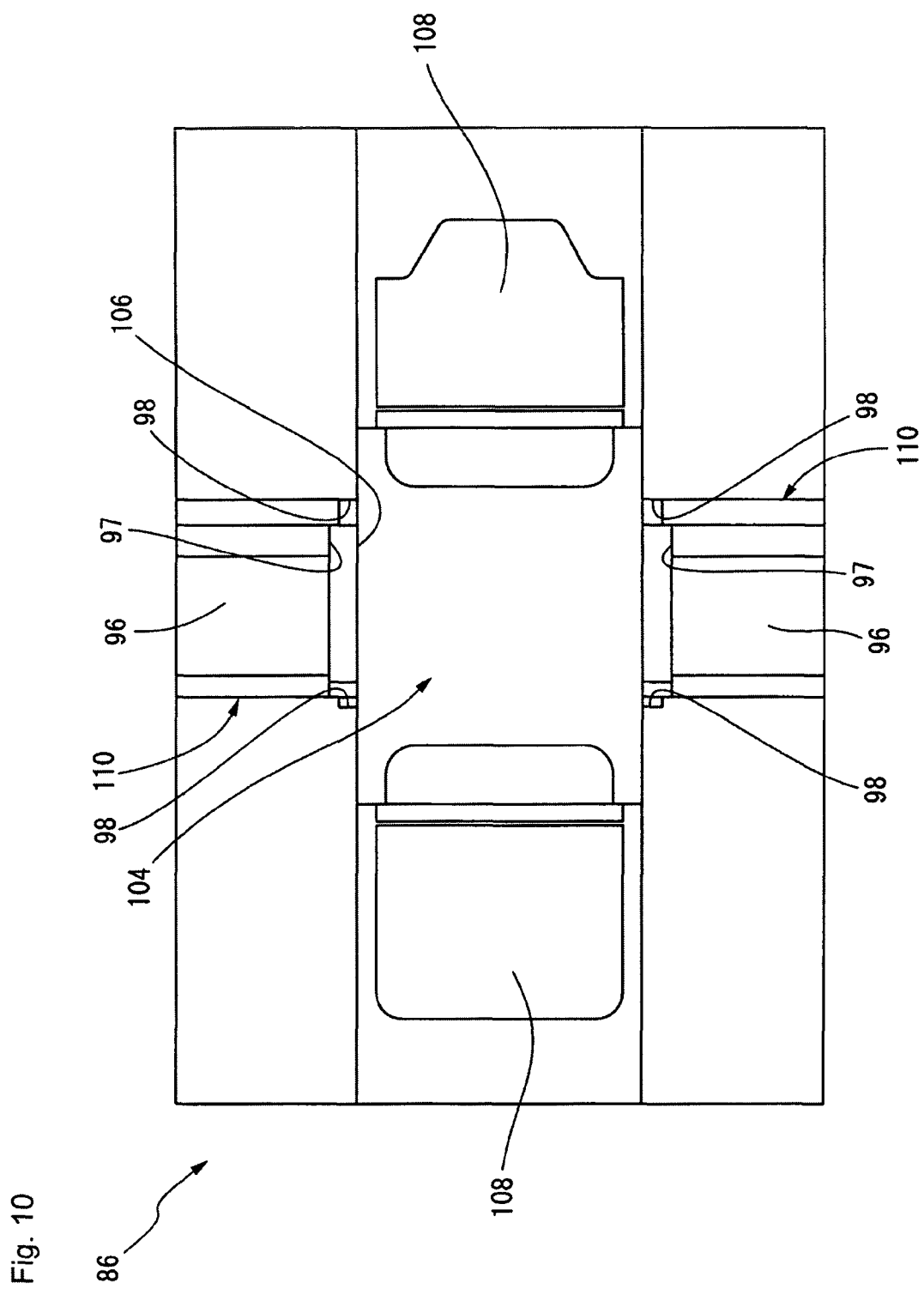
FIG. 10 is a bottom explanatory view of an upper die included in the molding die illustrated in FIG. 7.
Figure 11:
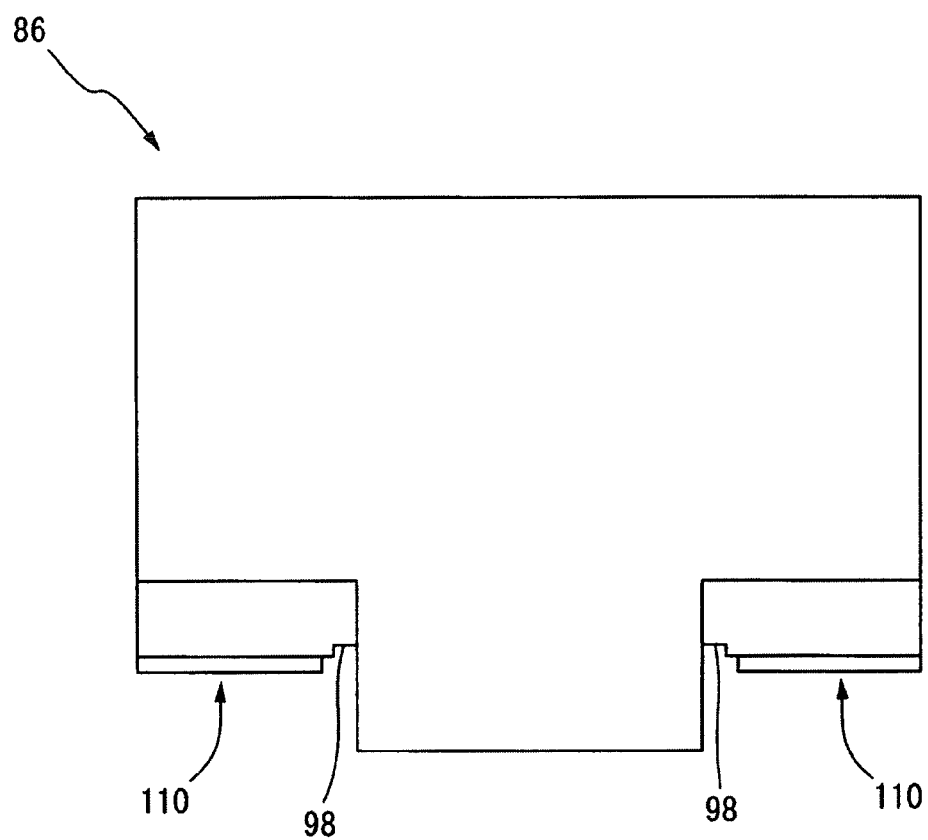
FIG. 11 is a right side explanatory view of the upper die included in the molding die illustrated in FIG. 7.

On the other hand, as FIGS. 7, 10 and 11 illustrate, the upper die 86, as a whole, has a shape of a long rectangular block with the same length and width as the lower die 84. At a central part of a lower surface of the upper die 86, an upper die side cavity formation recess 104 is provided. An inner surface of the upper die cavity formation recess 104 is an upper die side cavity surface 106 that has a substantially semi-arc shape corresponding to the upper side outer circumferential surface portion 20 (including the outer circumferential surfaces of the outer flanges 24) of the bushing body 16.

Further, on two sides in a length direction that sandwich therebetween the upper die side cavity formation recess 104 of the upper die 86, attachment portion accommodating recesses 108, 108 capable of respectively accommodating the attachment portions 60, 60 of the bracket 56 are provided.

Further, also on each of the two sides in a width direction that sandwich therebetween the upper die side cavity formation recess 104 of the upper die 86, one sandwiching projection 110 is provided in a projecting manner. The two sandwiching projections 110, 110 have the same structure as the two sandwiching projections 94, 94 provided on the lower die 84. That is, also on the lower surface of each sandwiching projection 110, a center die holding groove 96, a rubber protrusion formation recess 97, and two projection sandwiching recesses 98, 98 are formed having the same structures as those provided on each sandwiching projection 94 of the lower die 84. However, in the sandwiching projection 110 of the upper die 86 and the sandwiching projection 94 of the lower die 84, the one of the two projection sandwiching recesses 98, 98, having a larger separation distance from the sandwiching projection 110, 94, is arranged at a mutually opposite location in the respective length directions of the upper die 86 and the lower die 84.

Figure 12:
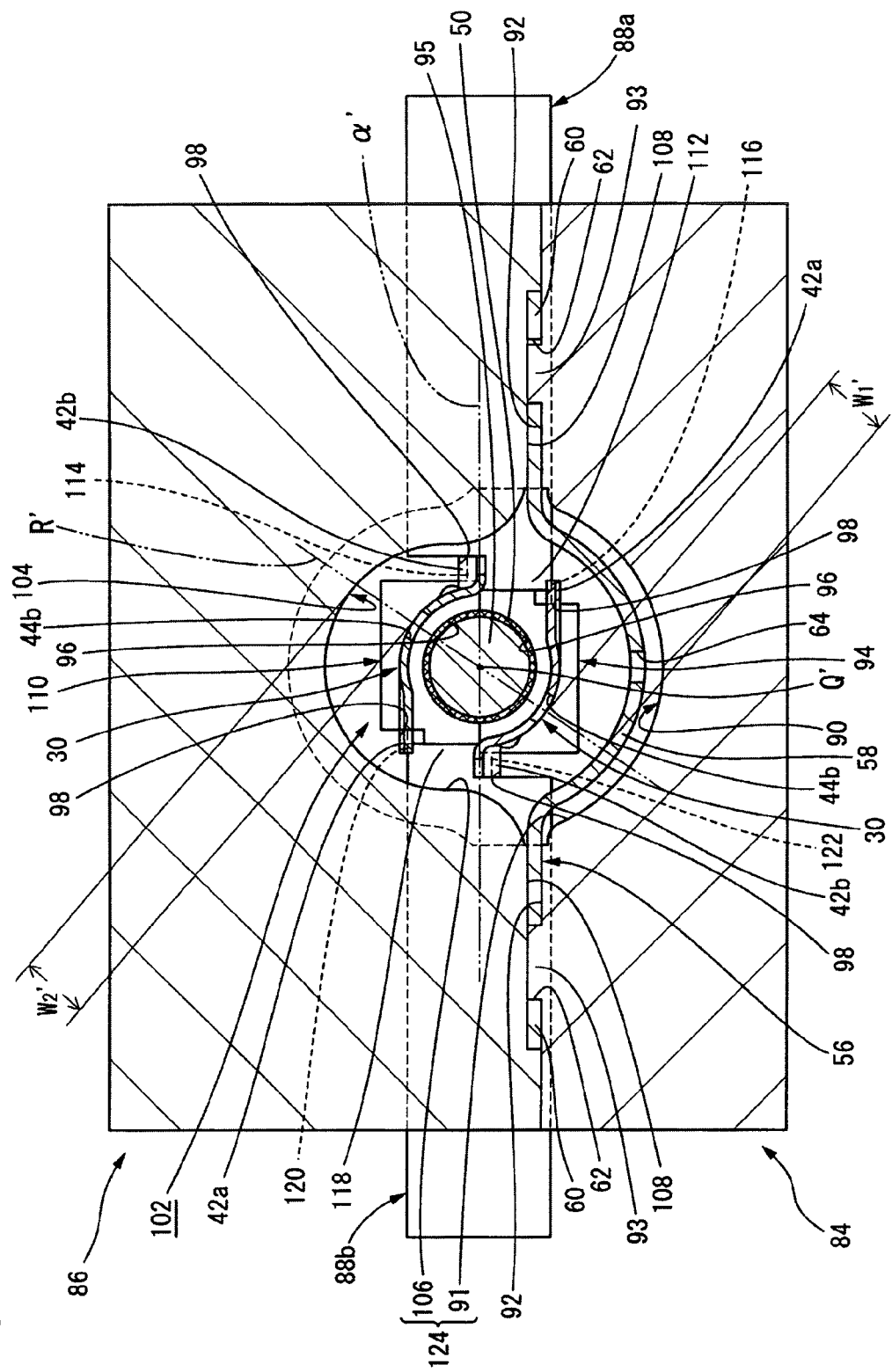
FIG. 12 is an explanatory view illustrating an example of a process in a case where the molding die illustrated in FIG. 7 is used to produce the stabilizer bushing illustrated in FIG. 3, and illustrating a state in which a mold cavity is formed inside the molding die and, in addition, two partition members and a bracket are set inside the mold cavity.

Further, as FIGS. 7 and 12 illustrate, the first and second sliding dies 88a, 88b each have, as a whole, a shape of a long rectangular block smaller than the lower die 84 and the upper die 86. The first and second sliding dies 88a, 88b are arranged at the same height, opposing each other in the horizontal direction. Further, a projection 112, which is a projecting lower portion of the first sliding die 88a, is provided on the surface of the first sliding die 88a opposing the second sliding die 88b. An upper surface of the projection 112 is an upper sandwiching surface 114 composed of a flat surface spreading in the horizontal direction, and a lower surface of a front end portion of the projection 112 is a lower sandwiching surface 116 composed of a flat surface spreading in the horizontal direction.

On the other hand, a projection 118, which is a projecting upper portion of the second sliding die 88b, is provided on the surface of the second sliding die 88b opposing the first sliding die 88a. An upper surface of the projection 118 is an upper sandwiching surface 120 composed of a flat surface spreading in the horizontal direction, and a lower surface of a front end portion of the projection 118 is a lower sandwiching surface 122 composed of a flat surface spreading in the horizontal direction.

When the die for injection molding having the structure as described above is used to produce the stabilizer bushing as illustrated in FIGS. 3 and 4, as FIG. 12 illustrates, first, the bracket 56 is set in the lower die 84 in a state in which the fixing portion 58 is accommodated inside the lower die side cavity formation recess 90. In this case, the fixing portion 58 of the bracket 56 is arranged with a predetermined gap or clearance between itself and the lower die side cavity surface 91. Further, the attachment surfaces 61, 61 of the attachment portions 60, 60 of the bracket 56 are respectively supported by the attachment portion support surfaces 92, 92 in a manner extending horizontally. In such a supported state, each positioning projection 93 that is integrally provided in a projecting manner on each attachment portion support surface 92 is fitted in the bolt insertion hole 62 of each attachment portion 60, and thereby, the bracket 56 as a whole is positioned.

Next, one partition member 30 is set in the lower die 84. In this case, the middle portion in the axial direction of the semi-tubular portion 32 of the partition member 30 is accommodated inside the lower die side cavity formation recess 90 at a position at a predetermined distance above the fixing portion 58 of the bracket 56. Further, the projections 42a, 42b that are respectively provided on the two ends in the axial direction of the partition member 30 are fitted inside the projection sandwiching recesses 98 of the two sandwiching projections 94, 94. In this way, each of the projections 42a, 42b of the partition member 30 is arranged in a manner extending in the horizontal direction.

Next, the liner cloth 50 that is formed in a tubular shape in advance is set in the lower die 84. In this case, two end portions in the axial direction of the center die 95, into a middle portion of which in the axial direction the liner cloth 50 is externally inserted, are respectively accommodated inside the two center die holding grooves 96, 96. In this way, the liner cloth 50 is arranged above the partition member 30 so as to cross over the lower die side cavity formation recess 90 in the width direction of the lower die 84.

As described above, the bracket 56, one partition member 30, and the liner cloth 50 are set in the lower die 84, and on the other hand, the other partition member 30 is set in the upper die 86 in a state in which the semi-tubular portion 32 is accommodated inside the upper die side cavity formation recess 104. In this case, the middle portion in the axial direction of the semi-tubular portion 32 of the partition member 30 is arranged at a predetermined distance below the upper die side cavity surface 106. Further, each of the projections 42a, 42b provided on the two ends in the axial direction of the partition member 30 is fitted in the projection sandwiching recess 98 of the two sandwiching projections 110, 110. Thereby, the partition member 30 is temporarily fixed to the upper die 86 and each of the projections 42a, 42b of the partition member 30 is arranged in a manner extending in the horizontal direction.

Here, for example, the shape of the upper die side cavity surface 106, the shape of the semi-tubular portion 32 of each of the two partition members 30, 30, or the shape of the fixing portion 58 of the bracket 56, or their curvature radii and the like, are properly configured. Thereby, a distance $W_2'$ between the upper die side cavity surface 106 and the semi-tubular portion 32 inside the upper die side cavity formation recess 104 along a perpendicular line R' is substantially the same as a distance $W_1'$ between the fixing portion 58 of the bracket 56 and the semi-tubular portion 32 inside the lower die side cavity formation recess 90 along the perpendicular line R'. Here the perpendicular line R' (which coincides with the first reference line R) is perpendicular to the central line P of the circumferential direction of each semi-tubular portion 32 and is perpendicular to a central axis Q' of the mold cavity 102 (mold cavity surface 124), which coincides with the central axis Q of the stabilizer bushing to be formed.

When the bracket 56, one partition member 30, and the liner cloth 50 are set in the lower die 84 and the other partition member 30 is set in the upper die 86, the upper die 86 is moved close to the lower die 84, and the upper die 86 and the lower die 84 are die-matched.

Thus, the attachment portions 60, 60 of the bracket 56 are sandwiched between the attachment portion support surfaces 92, 92 of the lower die 84 and the bottom surface of the attachment portion accommodating recess 108 of the upper die 86. Further, between the upper die 86 and the lower die 84, the mold cavity 102 is formed surrounded by a substantially tubular mold cavity surface 124 corresponding to the shape of the outer surface of the bushing body 16, which is formed by the upper die side cavity surface 106 and the lower die side cavity surface 91.

Thereby, the semi-tubular portion 32 of each of the two partition members 30, 30 is accommodated inside the mold cavity 102 in a manner that the inner surfaces of the semi-tubular portions 32, 32 are opposing each other and each semi-tubular portion 32 coaxially extends with the mold cavity 102 (mold cavity surface 124). Further, in the state of being accommodated inside the mold cavity 102, the two semi-tubular portions 32 are asymmetrically arranged with respect to a horizontal surface α' (which coincides with the reference plane α) containing the central axis Q' of the mold cavity 102.

Thereafter, or at the same time when the upper die 86 is moved close to the lower die 84, the pair of sliding dies 88a, 88b are moved close to each other in the horizontal direction. Thereby, the projections 42a, 42b of the two partition members 30, 30 are respectively sandwiched between the bottom surfaces of the projection sandwiching recesses 98, 98 of the lower die 84 and the lower sandwiching surfaces 116, 122 of the sliding dies 88a, 88b and between the bottom surfaces of the projection sandwiching recesses 98, 98 of the upper die 86 and the upper sandwiching surfaces 114, 120 of the sliding dies 88a, 88b. In this case, the projections 42a, 42b of the two partition members 30, 30 and the attachment portions 60 (attachment surfaces 61) of the bracket 56 are respectively horizontally arranged. Thereby, the projections 42a, 42b and the attachment portions 60 (attachment surfaces 61) are arranged in parallel to each other.

Next, unvulcanized rubber is injected into and filled in the mold cavity 102 through the sprue (not illustrated in the drawings) of the lower die 84. Thereby, the bushing body 16 is molded by vulcanization inside the mold cavity 102. In this case, an adhesive is applied in advance to the inner and outer circumferential surfaces of the fixing portion 58 of the bracket 56 and the inner and outer circumferential surfaces of the semi-tubular portion 32 of each partition member 30. Thereby, the fixing portion 58 of the bracket 56 and the semi-tubular portion 32 of each partition member 30 are bonded by vulcanization to the bushing body 16. Thus, the desired stabilizer bushing is obtained.

In this way, in the production method as described above, the projections 42a, 42b of each partition member 30 are set in the lower die 84 and the upper die 86 in a state of being arranged extending in parallel to the attachment surface 61 of each attachment portion 60 of the bracket 56. By moving the upper die 86 close to the lower die 84 in the vertical direction, the attachment portion 60 of the bracket 56 is sandwiched between the lower die 84 and the upper die 86 by a force of die matching (die clamping force) of the lower die 84 and the upper die 86. On the other hand, by moving the upper die 86 close to the lower die 84 in the vertical direction and moving the pair of sliding dies 88a, 88b close to each other in the horizontal direction, the projections 42a, 42b of the partition member 30 positioned inside the lower die side cavity formation recess 90 are sandwiched between the pair of sliding dies 88a, 88b and the lower die 84 by the force of die matching between the lower die 84 and the upper die 86, and the projections 42a, 42b of the partition member 30 positioned inside the upper die side cavity formation recess 104 are sandwiched between the pair of sliding dies 88a, 88b and the upper die 86 by the force of die matching between the lower die 84 and the upper die 86.

Therefore, by the die matching of the lower die 84 and the upper die 86, the upper and lower surfaces of the projections 42a, 42b of each partition member 30 are in close contact with the lower die 84, the upper die 86, and the pair of sliding dies 88a, 88b by a sufficiently large force. Therefore, when the unvulcanized rubber is injected into and filled in the mold cavity 102, the unvulcanized rubber in the mold cavity 102 can be effectively prevented from leaking to the outside from between the upper and lower surfaces of the projections 42a, 42b and the lower die 84, the upper die 86, and the pair of sliding dies 88a, 88b.

Therefore, according to production method of the present embodiment, the desired stabilizer bushing 10 can be very easily and efficiently produced without having to perform post-processing such as deburring after the bushing body 16 is molded.

Further, the projections 42a, 42b of each partition member 30 are formed in flat plate forms extending in parallel to the attachment surface 61 of each attachment portion 60 of the bracket 56. Therefore, by sliding the pair of sliding dies 88a, 88b in the horizontal direction, the projections 42a, 42b can be sandwiched between the lower die 84 and the upper die 86. For this reason, for example, the projections 42a, 42b of each partition member 30 are formed in flat plate forms extending in a direction intersecting the attachment surface 61 of each attachment portion 60 of the bracket 56. Therefore, different from a case where it is necessary to slide the sliding dies 88a, 88b in a direction inclined with respect to the horizontal direction, a need can be advantageously eliminated for configuring the lower die 84 and the upper die 86 in separate pluralities of parts of a portion forming the mold cavity 102 of the bushing body 16 and a portion sandwiching the projections 42a, 42b between the pair of sliding dies 88a, 88b. Thereby, simplification of the structure and reduction of production cost of the lower die 84 and the upper die 86 can both be advantageously achieved.

Here, when the bushing body is integrally molded by vulcanization, the unvulcanized rubber inside the mold cavity 102 flows from a portion positioned on the outer side of each partition member 30 (portion that forms the outer rubber portion 48) toward a portion on the inner side of each partition member 30 (portion that forms the inner rubber portion 46). A portion of the unvulcanized rubber flows around the peripheral edge of each partition member 30 and another portion of the unvulcanized rubber flows through the three through holes 44a, 44b, 44c provided on each partition member 30.

Therefore, for example, as compared to a case where partition members that do not have the through holes 44a, 44b, 44c are used and the entire unvulcanized rubber flows around the peripheral edge of each partition member 30 from the outer side of the partition member 30 to the inner side of the partition member 30, the flow distance of the unvulcanized rubber inside the portion of the mold cavity 102 positioned on the inner side of each partition member 30 (referred to as an inner rubber portion mold cavity 102 portion in the following) is advantageously reduced. Thereby, a pressure applied to the liner cloth 50 based on the flow pressure of the unvulcanized rubber flowing in the inner rubber portion mold cavity 102 portion can be advantageously reduced.

Moreover, the three through holes 44a, 44b, 44c are formed only at positions that equally divide the partition member 30 in the circumferential direction and in the axial direction of the partition member 30. Therefore, the flow distance in the circumferential direction in the inner rubber portion mold cavity 102 portion of the unvulcanized rubber flowed around the outer side of each of the outer flanges 34a, 34b of the partition member 30 into the inner rubber portion mold cavity 102 portion of the partition member 30 and the flow distance in the circumferential direction in the inner rubber portion mold cavity 102 portion of the unvulcanized rubber 60 flowed through the three through holes 44a, 44b, 44c of the partition member 30 into the inner rubber portion mold cavity 102 portion are the same as each other. Further, the flow distance in the axial direction in the inner rubber portion mold cavity 102 portion of the unvulcanized rubber flowed around the outer side of the edge portions in the axial direction of the partition member 30 into the inner rubber portion mold cavity 102 portion and the flow distance in the axial direction in the inner rubber portion mold cavity 102 portion of the unvulcanized rubber flowed through the three through holes 44a, 44b, 44c of the partition member 30 into the inner rubber portion mold cavity 102 portion are the same as each other. This allows the pressure applied to the liner cloth 50 based on the flow pressure of the unvulcanized rubber flowing inside the inner rubber portion mold cavity 102 portion to be uniform in both the circumferential direction and the axial direction of the liner cloth 50.

Therefore, in the production method of the present embodiment, since the inner rubber portion 46 is thin, despite the inner rubber portion mold cavity 102 portion has a narrow width, occurrence of partial insufficient filling of the unvulcanized rubber into the inner rubber portion mold cavity 102 portion can be advantageously avoided. Further, a situation in which the liner cloth 50 is fixed to the inner rubber portion 46 in a partially wavy state due to the flow pressure of the unvulcanized rubber or in a wrinkled state, and a situation in which a portion of the unvulcanized rubber oozes out to the inner circumferential surface of the liner cloth 50 and the inner circumferential surface of the liner cloth 50 is partially covered by the rubber oozed out, can also be effectively eliminated.

As a result, occurrence of variation in the slidability with respect to the stabilizer bar 12 in the circumferential direction of the liner cloth 50 due to waviness and wrinkles of the liner cloth 50 or a rubber film or the like that is partially formed on the inner circumferential surface of the liner cloth 50 is advantageously eliminated, and smooth rotation in the torsional direction of the stabilizer bar 12 can be constantly stably ensured.

In the above, a specific configuration of the present invention is described. However, the description is merely by way of example. The present invention is not limited in any way by the above description.

For example, the overall shape of the bushing body 16 is not limited in any way by those illustrated. For example, the upper side outer circumferential surface portion 20 is a flat surface, and the overall shape may be substantially an inverted saddle-like shape or an inverted barrel-like shape.

Further, the shape of the semi-tubular portion 32 of the partition member 30 is not limited in any way to the semi-tubular shape having an arc-shaped cross section. For example, a semi-tubular shape having an elliptical, a U-shaped, a polygon-like, or a formless cross section is also possible.

Further, the cross-sectional shape of the fixing portion 58 of the bracket 56 is not particularly limited to an arc shape. A shape, in which the thickness $W_1$ along the first reference line R of the portion of the lower outer rubber portion 54 of the outer rubber portion 48 positioned on the more inner side than the fixing portion 58 of the bracket 56 and the thickness $W_2$ along the first reference line R of the upper outer rubber portion 52 can be made substantially the same, can be suitably adopted as the shape of the fixing portion 58.

Further, in the above embodiment, the sliding member is configured by using the liner cloth 50, which is made of a cloth member, a knitted fabric, and the like. However, for example, by burning a well-known lubricant such as molybdenum disulfide and fluororesin onto the inner circumferential surface of the inner rubber portion 46 using a conventional method, a coating layer having surface lubricity is formed by lamination, and the sliding member can be configured by using this coating layer.

Further, the sliding member may be omitted, and the stabilizer bar 12 inserted into the inner bore 18 of the bushing body 16 may be bonded to the inner circumferential surface of the inner rubber portion 46.

In addition, in the above embodiment, a specific example is described in which the present invention is applied to a stabilizer bushing for an automobile. However, the present invention is of course also advantageously applicable to any stabilizer bushing for a vehicle other than an automobile.

Others will not be enumerated. However, the present invention can also be carried out in an embodiment adding various changes, modifications, improvements, and the like based on the knowledge of a person skilled in the art. Such an embodiment is naturally included in the scope of the present invention as far as not departing from the spirit of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A stabilizer bushing for a vehicle comprising:
   (a) a bushing body made of a tubular rubber elastic body having an inner bore into which a stabilizer bar is inserted;
   (b) a bracket having a mounting portion mounted on an outer peripheral portion of the bushing body and an attachment portion provided with two mutually parallel attachment surfaces extending outwardly in a direction perpendicular to an axial direction of the bushing body, the bracket being attached to a vehicle body in a state in which the bushing body is inclinedly arranged with respect to a horizontal direction by attaching the attachment portion to the vehicle body in a state in which the two attachment surfaces are superimposed on the vehicle body while being inclined with respect to the horizontal direction; and
   (c) two partition members embedded in the bushing body in a manner partitioning the bushing body into an inner rubber portion positioned on an inner side and an outer rubber portion positioned on an outer side, the two partition members each having a semi-tubular portion and being rigid, wherein
   the semi-tubular portions of the two partition members are asymmetrically arranged with respect to a reference plane parallel to the two attachment surfaces of the bracket and containing a central axis of the bushing body, and
   a length from one end to the other end in a circumferential direction of the semi-tubular portion in a projection view obtained by projecting the semi-tubular portion of each of the partition members to a horizontal surface along a vertical direction is equal to or larger than a diameter of the stabilizer bar.

2. The stabilizer bushing for a vehicle according to claim 1, wherein
the two partition members are arranged in such a manner that centers in the circumferential direction of the semi-tubular portions are positioned on a vertical line extending in the vertical direction in the state in which the bracket is attached to the vehicle body, and
the inner rubber portion is thinner than the outer rubber portion.

3. The stabilizer bushing for a vehicle according to claim 1, wherein
the mounting portion of the bracket is fixed to an outer peripheral portion of at least one of two rubber portions of the outer rubber portion positioned on two sides in the vertical direction sandwiching therebetween the semi-tubular portions of the two partition members in the state in which the bracket is attached to the vehicle body.

4. The stabilizer bushing for a vehicle according to claim 1, wherein
the semi-tubular portions of the two partition members each have a circular arc-shaped cross-sectional shape, and
the two semi-tubular portions are arranged forming a concentric circle with an inner circumferential surface of a circular cross section of the bushing body.

5. The stabilizer bushing for a vehicle according to claim 1, wherein
the mounting portion of the bracket has a circular arc-shaped cross-sectional shape.

6. The stabilizer bushing for a vehicle according to claim 1, wherein
two rubber portions of the outer rubber portion positioned on two sides in the vertical direction sandwiching therebetween the semi-tubular portions of the two partition members in the state in which the bracket is attached to the vehicle body have the same thickness as each other along a vertical line.

7. The stabilizer bushing for a vehicle according to claim 1, wherein
through holes capable of allowing unvulcanized rubber of the rubber elastic body that constitutes the bushing body to pass through are formed on the semi-tubular portion of the partition member.

8. The stabilizer bushing for a vehicle according to claim 1, wherein
the partition member has projections respectively projecting from two end portions in an extending direction of the semi-tubular portion outwardly in directions perpendicular to the axial direction of the bushing body, and
the projecting directions of the projections are parallel to the attachment surfaces of the bracket.

9. The stabilizer bushing for a vehicle according to claim 1, wherein
a sliding member having surface lubricity is fixed on an inner circumferential surface of the bushing body.

10. A method for producing a stabilizer bushing for a vehicle,
the stabilizer bushing comprising:
(a) a bushing body made of a tubular rubber elastic body having an inner bore into which a stabilizer bar is inserted;
(b) a bracket having a mounting portion fixed and mounted on an outer peripheral portion of the bushing body and an attachment portion provided with two mutually parallel attachment surfaces extending outwardly in a direction perpendicular to an axial direction of the bushing body, the bracket being attached to a vehicle body in a state in which the bushing body is inclinedly arranged with respect to a horizontal direction by attaching the attachment portion to the vehicle body in a state in which the two attachment surfaces are superimposed on the vehicle body while being inclined with respect to the horizontal direction; and
(c) two partition members embedded in the bushing body in a manner partitioning the bushing body into an inner rubber portion positioned on an inner side and an outer rubber portion positioned on an outer side, the two partition members being rigid,
each of the partition members being configured to include a semi-tubular portion coaxially extending with the bushing body and projections respectively projecting from two end portions in an extending direction of the semi-tubular portion outwardly in a direction perpendicular to the axial direction of the bushing body, and the projections of the partition members respectively projecting out from end surfaces on two sides in the axial direction of the bushing body,
the method comprising:
preparing two parts as the partition members each having a length equal to or larger than a diameter of the stabilizer bar, the length being from one end to the other end in a circumferential direction of the semi-tubular portion in a projection view obtained by projecting the semi-tubular portion to a horizontal surface along a vertical direction;
die-matching a first die and a second die to form a mold cavity having a tubular cavity surface, in which the attachment portion of the bracket is sandwiched between the first die and the second die and the bushing body is to be formed between the first die and the second die;
accommodating the semi-tubular portions of the two partition members inside the mold cavity in a state in which the semi-tubular portions are arranged coaxial with the mold cavity and asymmetrical with respect to a reference plane containing a central axis of the mold cavity and parallel to the two attachment surfaces of the bracket, and projecting out from the mold cavity the projections of the two partition members in a state of being positioned parallel to the attachment surfaces of the bracket, and, in addition, accommodating the mounting portion of the bracket with respect to an outer peripheral portion of the bushing body in one of two mold cavity portions positioned on two sides that sandwich therebetween the two partition members;
respectively sandwiching the projections of the two partition members that project out from the mold cavity between a pair of sliding dies and the first and second dies by sliding the pair of sliding dies in a direction perpendicular to a die-matching direction of the first and second dies; and
filling unvulcanized rubber of the rubber elastic body that constitutes the bushing body into the mold cavity and solidifying the unvulcanized rubber to form the bushing body, and embedding the semi-tubular portions of the two partition members in the bushing body and fixing the mounting portion of the bracket to the outer peripheral portion of the bushing body.

* * * * *